(12) United States Patent
Nishimura et al.

(10) Patent No.: US 10,833,612 B2
(45) Date of Patent: Nov. 10, 2020

(54) ELECTRIC WORKING MACHINE

(71) Applicant: MAKITA CORPORATION, Anjo-shi, Aichi (JP)

(72) Inventors: Masumi Nishimura, Anjo (JP); Yoshiteru Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/353,157

(22) Filed: Mar. 14, 2019

(65) Prior Publication Data
US 2019/0305699 A1  Oct. 3, 2019

(30) Foreign Application Priority Data
Mar. 30, 2018  (JP) .................. 2018-068618

(51) Int. Cl.
| | |
|---|---|
| *A01D 34/90* | (2006.01) |
| *H02P 6/15* | (2016.01) |
| *H02P 6/28* | (2016.01) |
| *H02P 6/18* | (2016.01) |
| *A01G 3/08* | (2006.01) |

(52) U.S. Cl.
CPC .............. *H02P 6/153* (2016.02); *H02P 6/186* (2013.01); *H02P 6/28* (2016.02); *A01D 34/90* (2013.01); *A01G 3/088* (2013.01); *H02P 2203/03* (2013.01)

(58) Field of Classification Search
CPC ............ H02P 6/153; H02P 6/28; A01D 34/90
See application file for complete search history.

(56) References Cited

U.S. PATENT DOCUMENTS

| | | | | |
|---|---|---|---|---|
| 2004/0251860 | A1* | 12/2004 | Ehsani ..................... | H02P 6/06 318/400.01 |
| 2008/0018279 | A1* | 1/2008 | Fukamizu .............. | H02P 6/182 318/432 |
| 2011/0279073 | A1 | 11/2011 | Wichert | |
| 2016/0197567 | A1* | 7/2016 | Nishiyama ............... | H02P 6/18 318/400.17 |
| 2016/0261214 | A1* | 9/2016 | Greetham ................ | H02P 6/14 |

* cited by examiner

*Primary Examiner* — Cortez M Cook
(74) *Attorney, Agent, or Firm* — Oliff PLC

(57) ABSTRACT

An electric working machine includes an inverter and a controller. The controller switches a current conduction pattern via the inverter and performs a PWM control of a conduction current to a brushless motor. The controller includes switching patterns as the current conduction pattern switched for every commutation timing. The switching patterns include different on and off states for different switching elements. The controller sequentially switches a switching pattern synchronously with a period of the PWM control, detects a rotational position of a brushless motor from a magnitude relation between inductances of the brushless motor produced by switching the switching pattern, and sets the commutation timing.

10 Claims, 23 Drawing Sheets

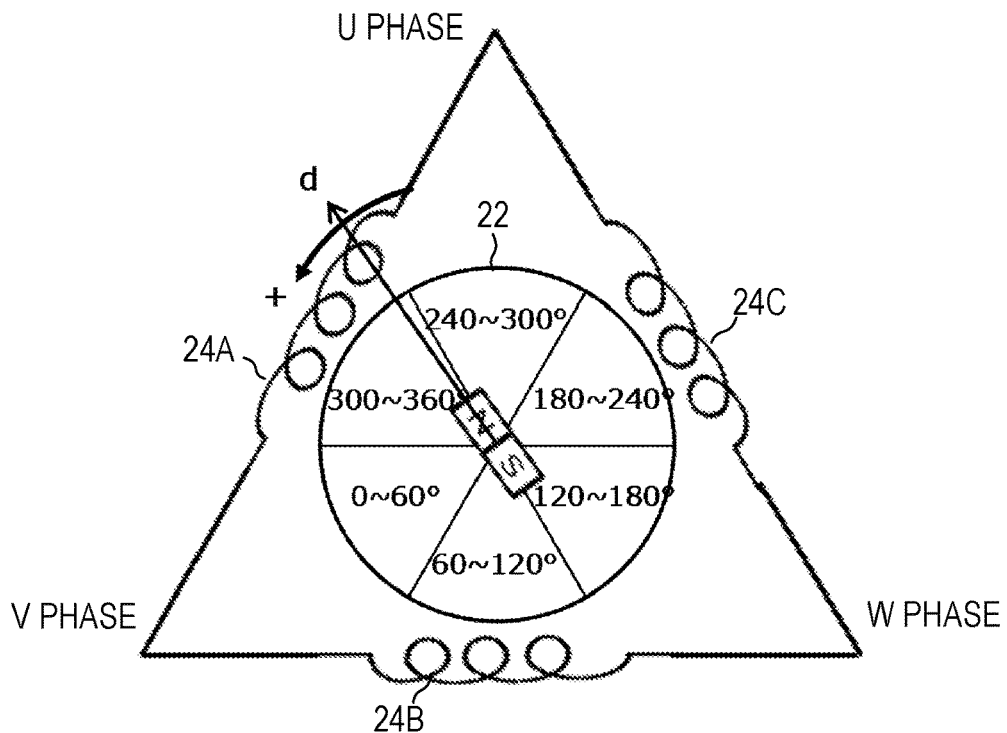

FIG.4A

| ROTOR POSITION | ROTATIONAL DIRECTION | SWITCHING PATTERNS | | INITIAL STATE OF CURRENT VALUE | PATTERN 3 | INITIAL STATE OF TIMER VALUE |
|---|---|---|---|---|---|---|
| | | PATTERN 1 | PATTERN 2 | | | |
| 0~60° | + | UL,VH,WL | UL,VH,WH | $I_1 < I_2$ | UL,VH | $T_1 > T_2$ |
| | − | UH,VL,WH | UL,VL,WH | $I_1 < I_2$ | VL,WH | $T_1 > T_2$ |
| 60~120° | + | UL,VH,WH | UL,VL,WH | $I_1 < I_2$ | UL,WH | $T_1 > T_2$ |
| | − | UH,VL,WL | UH,VL,WH | $I_1 < I_2$ | UH,VL | $T_1 > T_2$ |
| 120~180° | + | UL,VL,WH | UH,VL,WH | $I_1 < I_2$ | VL,WH | $T_1 > T_2$ |
| | − | UH,VH,WL | UH,VL,WL | $I_1 < I_2$ | UH,WL | $T_1 > T_2$ |
| 180~240° | + | UH,VL,WH | UH,VL,WL | $I_1 < I_2$ | UH,VL | $T_1 > T_2$ |
| | − | UL,VH,WL | UH,VH,WL | $I_1 < I_2$ | VH,WL | $T_1 > T_2$ |
| 240~300° | + | UH,VL,WL | UH,VH,WL | $I_1 < I_2$ | UH,WL | $T_1 > T_2$ |
| | − | UL,VH,WH | UL,VH,WL | $I_1 < I_2$ | UL,VH | $T_1 > T_2$ |
| 300~360° | + | UH,VH,WL | UL,VH,WL | $I_1 < I_2$ | VH,WL | $T_1 > T_2$ |
| | − | UL,VL,WH | UL,VH,WH | $I_1 < I_2$ | UL,WH | $T_1 > T_2$ |

FIG.4B

ELECTRIC WORKING MACHINE

CROSS-REFERENCE TO RELATED APPLICATIONS

This application claims the benefit of Japanese Patent Application No. 2018-068618 filed Mar. 30, 2018 in the Japan Patent Office, the entire disclosure of which is incorporated herein by reference.

BACKGROUND

The present disclosure relates to an electric working machine that includes a brushless motor as a power source.

A brushless motor requires a current conduction pattern to a stator winding to be switched for every given rotational angle of a rotor. Therefore, an electric working machine that includes a brushless motor is equipped with a detector configured to detect a rotational position of the brushless motor (more specifically, a rotational position of the rotor).

Generally known detectors are rotation sensors that generate signals corresponding to a rotational angle of a rotor, or "sensor-less" detectors that detect the rotational position of a rotor from an induced voltage generated by rotations of the rotor.

The aforementioned sensor-less detectors may be used to detect a voltage at a terminal of each phase of the brushless motor and detect a given rotational position of the rotor when the detected voltage crosses a zero crossing point.

Thus, compared with an electric working machine configured to use a rotation sensor to detect the rotational position, an electric working machine including a sensor-less detector can have a simple device configuration.

However, since the induced voltage is proportional to a rotational frequency of the brushless motor, the induced voltage sometimes cannot reach the voltage level required to detect the rotational position when the brushless motor rotates at a low speed. In this case, the rotational position cannot be detected.

Unlike the above configuration, there is suggested a different sensor-less detector configured to detect the rotational position of the brushless motor without depending on the induced voltage. The suggested detector alternately generates a conduction term, which is for generating a rotational torque on the rotor, and a detection term, which is for detecting the position of the rotor (for example, see the specification of the U.S. patent application publication No. 2011/0279073).

The suggested detector supplies windings of the brushless motor with a current for the position detection for a sufficiently short time compared with the conduction term for generating the rotational torque on the brushless motor, measures a value of the supplied current, and calculates an inductance of the stator winding. The detector detects the given rotational position at the maximum inductance.

SUMMARY

With the device suggested above, the rotational position of the brushless motor can still be detected when the brushless motor rotates at a low speed since the device calculates the inductance that changes in accordance with the rotational position of the brushless motor and detects the rotational position at a timing when the inductance reaches the maximum.

However, the device suggested above requires accuracy in calculating the inductance since the device obtains the inductance by supplying a low current for detecting the position, which will not generate the rotational torque on the rotor, and by detecting this low current.

Thus, the device suggested above faces a problem of cost increase due to a necessity to use an expensive high-performance arithmetic circuit for the position detection, although the device can eliminate the need for a rotation sensor.

In addition, the device suggested above needs to alternately supply the winding with a driving current for generating the rotational torque on the rotor and a current for detecting the position. This does not allow generation of the rotational torque on the rotor during a position detection term. As a result, acceleration characteristics of the brushless motor at the time of increasing its rotational frequency can be decreased, which may cause the brushless motor to stop when a load is applied to an output shaft of the brushless motor.

Preferably, one aspect of the present disclosure is to allow an electric working machine that includes a brushless motor capable of detecting a rotational position of the brushless motor when the brushless motor is rotating at a low speed without using a rotation sensor and at a low cost.

The electric working machine in one aspect of the present disclosure includes a brushless motor as a power source, and an inverter and a controller to drive the brushless motor.

The inverter includes switching elements disposed in conduction paths between a direct-current power source and terminals of the brushless motor. The inverter is configured to control electric conduction to windings of the brushless motor and a direction of the electric conduction via the switching elements.

The controller is configured to perform a PWM control of a conduction current to the windings by switching a current conduction pattern to conduct electricity to the windings via the inverter for every given commutation timing of the brushless motor and turning on and off the switching elements of the inverter in accordance with the current conduction pattern.

As the current conduction patterns switched for the every given commutation timing, the controller includes switching patterns including different on and off states of the switching elements. The controller is configured to sequentially switch the switching pattern for controlling on and off states of the switching elements to one of the switching patterns synchronously with a period of the PWM control.

By thus switching the switching pattern, a current path through the brushless motor changes. An inductance generated on the brushless motor in every current path varies due to a difference in magnetic permeability of a magnet disposed in a rotor (so-called saliency of a rotor) albeit the same rotational position.

More specifically, the controller is configured to change the inductance of the stator winding by sequentially switching the current conduction pattern to one of the switching patterns within a rotation range (angle) of the rotor from one commutation timing to the next commutation timing.

The controller is configured to detect the rotational position of the brushless motor (rotor) from a magnitude relation between inductances of different current paths, which are produced by switching the switching pattern, thereby to set the commutation pattern.

Accordingly, the electric working machine in the present disclosure can detect the rotational position without using a rotation sensor even when the brushless motor is rotating at a low speed.

In addition, unlike the aforementioned conventional device, the electric working machine need not alternately produce a conduction term for generating a rotational torque on the rotor and a detection term for position detection to supply an electric current for the position detection during the detection term and accurately calculate the inductance of the winding from the current value.

In other words, the electric working machine in the present disclosure only need to determine the magnitude relation between the inductances produced due to different switching patterns in order to detect the rotational position of the brushless motor, and thus need not accurately calculate the inductance from the current for detecting the position unlike the conventional devices.

Thus, unlike the conventional devices, the electric working machine in the present disclosure need not have an expensive high-performance arithmetic circuit disposed in the controller that detects the rotational position, which can simplify the configuration of the controller and reduce cost.

Since the controller only need to determine the magnitude relation between the inductances produced due to different switching patterns in order to detect the rotational position, the controller need not calculate the inductance from an electric current flowing through the brushless motor and so on unlike the conventional devices.

More specifically, the electric working machine in the present disclosure includes a current detector configured to detect an electric current flowing through the brushless motor. The controller is configured to obtain a current value detected in the current detector when electricity is conducted to the brushless motor with each of the switching patterns as a parameter representing an inductance, and detect the rotational position from a magnitude relation between obtained current values.

This allows the controller to detect the rotational position only with the magnitude relation between the current values obtained via the current detector without calculating the inductance from the electric current flowing through the brushless motor and so on. The device configuration can thus be simpler.

The controller creates a conduction path to the brushless motor by turning on the switching elements of the inverter in accordance with the switching pattern. Nevertheless, a reflux current or a regenerative current still flows through the brushless motor although the switching elements are turned off and the conduction path is interrupted for the following reason.

That is, due to an interruption in the electric conduction to the brushless motor, a voltage is generated from energy accumulated in the windings by current conduction; therefore, the inverter includes a diode for reflux or for regeneration to keep conducting electric current to the brushless motor by the generated voltage.

The reflux current or the regenerative current can be reduced to zero during a time since the conduction path from the direct-current power source is interrupted by the switching elements until the conduction path is completed again if an on-time of the switching elements per one period of the PWM control is short (in other words, if a duty ratio is low). This is because the energy accumulated in the windings of the brushless motor during current conduction from the direct-current power source is small.

If the on-time of the switching elements per one period of the PWM control increases (if the duty ratio increases), the energy accumulated in the windings also increases. Thus, the reflux current or the regenerative current continues to flow during the time since the conduction path from the direct-current power source is interrupted until the conduction path is completed again.

If the switching elements of the inverter is turned on in accordance with the switching pattern as the reflux current or the regenerative current is flowing, then the reflux current or the regenerative current flows as an initial current in the conduction path from the direct-current power source to the brushless motor; and then the electric current flowing though the conduction path changes from the initial current.

Accordingly, to detect the rotational position from the magnitude relation between the current values under the condition that the reflux current or the regenerative current cannot be reduced to zero within one period of the PWM control, the controller may be configured as follows.

The controller may be configured to obtain a difference between a conduction-start current at an initiation of conduction and a conduction-stop current at an end of the conduction as a parameter representing an inductance value of the brushless motor when electricity is conducted to the brushless motor with the switching pattern.

Even if the reflux current or the regenerative current is flowing when the switching elements of the inverter are turned on in accordance with the switching pattern, the aforementioned configuration allows the controller to obtain the flowing reflux current or regenerative current as an initial current conduction value, and obtain an amount of change from the initial current conduction value to the conduction-stop current as the current value for the position detection.

In this case, for example, if the duty ratio of the PWM control is large and thus the reflux current or the regenerative current is flowing when electricity is conducted to the brushless motor with the switching pattern, the controller can detect the rotational position of the brushless motor without being influenced by the reflux current or the regenerative current.

The controller may also measure a time for a current value detected in the current detector to reach a given threshold value since an initiation of the electric conduction to the brushless motor with the switching patterns as a parameter representing the inductance of the brushless motor for each switching pattern.

This enables detection of the rotational position of the brushless motor from only the magnitude relation between measured times without calculating the inductance, which can further simplify the machine configuration similarly to a case where the rotational position is detected from the magnitude relation between the current values.

To measure the time for the current value to reach the given threshold value as a parameter representing the inductance under the condition that the reflux current or the regenerative current cannot be reduced to zero within one period of the PWM control, the controller may be configured as follows.

The controller may be configured to measure a time for the current value to change by a given threshold value from the conduction-start current at an initiation of conduction as a parameter representing the inductance value of the brushless motor when electricity is conducted to the brushless motor with the switching pattern.

Even if the reflux current or the regenerative current is flowing when electricity is conducted to the brushless motor with the switching pattern, the aforementioned configuration allows the controller to use the flowing reflux current or regenerative current as the initial current conduction value and obtain the time for the current value to change from the initial current conduction value by the given threshold value.

Accordingly, the aforementioned configuration also allows the controller to detect the rotational position of the brushless motor without being influenced by the reflux current or the regenerative current.

Preferably, the switching patterns may each be configured to generate the rotational torque on the rotor when being used to control the on and off states of the switching elements.

This allows generation of the rotational torque on the rotor to drive the motor even if the switching pattern is switched. Thus, unlike the aforementioned conventional devices, inabilities to generate the rotational torque on the rotor during the position detection term can be reduced.

The electric working machine in the present disclosure can accordingly help inhibit a lowering in acceleration characteristics when increasing the rotation of the brushless motor for the position detection, an arrest of the rotation of the brushless motor in response to an application of a load on the output shaft of the brushless motor, and so on.

The controller may be configured to use a timing when the magnitude relation between the inductances of the brushless motor changes due to the switching of the switching patterns as a detection timing to detect the rotational position.

More specifically, the controller may be configured to detect, as a given rotational position of the rotor, a timing when the magnitude relation between the current values obtained as parameters representing the inductances is changed or a timing when the magnitude relation between the times obtained as parameters representing the inductances is changed.

This enables detection of the given rotational position by only comparing the latest value of each parameter with the previous value of each parameter, eliminating a need for correction calculations and so on for each parameter. The rotational position can thus be detected more easily.

The magnitude relation of each of the aforementioned parameters (inductances, current values, times, and so on) may change due to noises and the like. Thus, the rotational position may be finally determined after confirming that the magnitude relation is stable for a given period of time since the change.

The current value flowing through the brushless motor may be unstable immediately after the current conduction pattern is switched at the commutation timing. Thus, an operation of the position detection to determine the magnitude relation between the aforementioned parameters may be started after a given time has passed after the commutation timing.

The controller may also be configured to adjust the on-time of the switching elements in accordance with a power supply voltage of the direct-current power source when performing the PWM control of the brushless motor with the switching pattern.

More specifically, the electric current flowing through the brushless motor changes in accordance with the power supply voltage. Thus, the electric current still changes as the power supply voltage is changed even if the on-time of the switching elements (that is, a conduction time to the stator winding) is constant.

Accordingly, if the on-time of the switching elements is adjusted in accordance with the power supply voltage of the direct-current power source, it inhibits fluctuations of the electric current flowing through the brushless motor due to fluctuations of the power supply voltage, and thus enables a stable position detection.

BRIEF DESCRIPTION OF THE DRAWINGS

Example embodiments of the present disclosure will be described hereinafter with reference to the accompanying drawings, in which:

FIG. 4A is a diagram illustrating a current conduction pattern for conducting electricity to the motor in a low-speed mode;

FIG. 4B is a diagram describing the current conduction pattern for conducting electricity to the motor in the low-speed mode;

DETAILED DESCRIPTION OF THE PREFERRED EMBODIMENTS

Embodiments of the present invention will be explained hereinafter with reference to the drawings.

Embodiment 1

In the present embodiment, an electric working machine is explained using a grass mower as an example.

Figure 1:
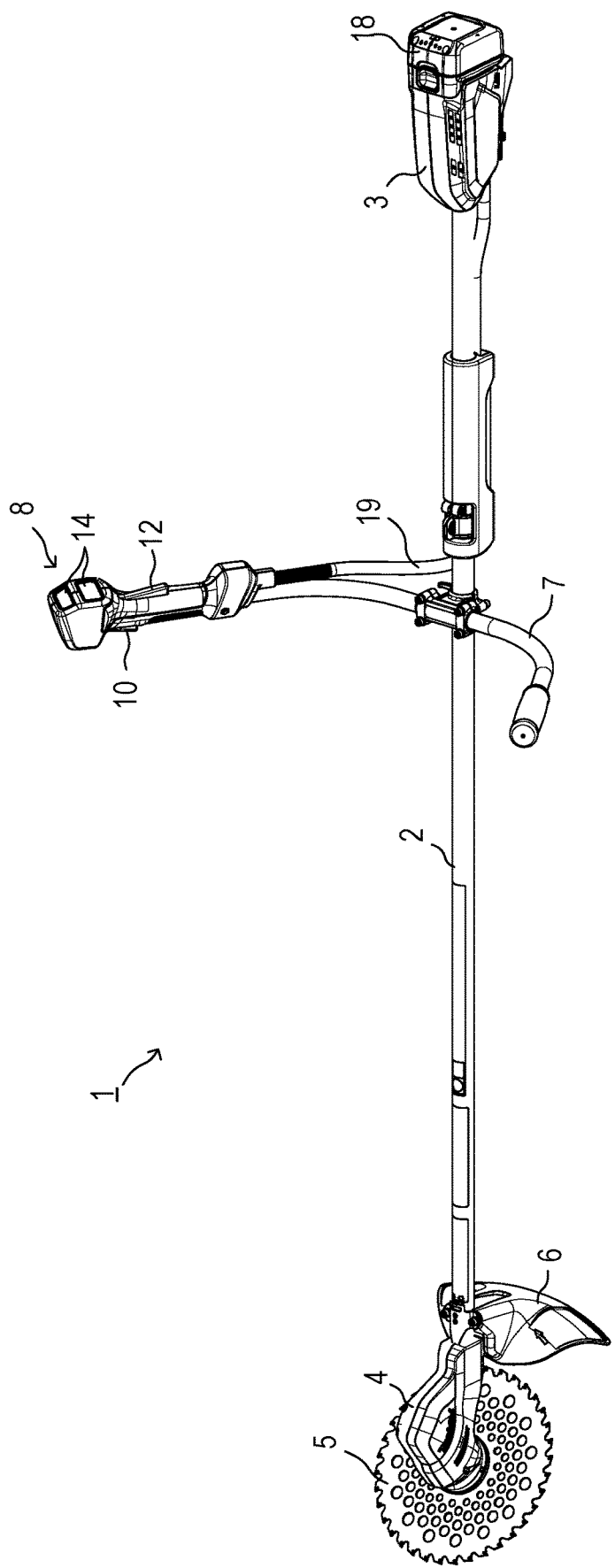
FIG. 1 is a perspective view of an external appearance of an electric working machine according to an embodiment.

As shown in FIG. 1, an electric working machine 1 in the present embodiment is a grass mower including a main pipe 2, a control unit 3, a drive unit 4, and a handle 7. The main pipe 2 is shaped into a long hollow rod. The control unit 3 is disposed in a rear end of the main pipe 2. The drive unit 4 is disposed in a front end of the main pipe 2.

A rotating blade 5 is detachably and rotatably attached to the drive unit 4. The rotating blade 5 is configured to mow objects to be mown, such as grass and small-diameter trees. The rotating blade 5 shown in FIG. 1 is a so-called tipped saw.

The rotating blade 5 in the present embodiment is made of metal, shaped into a circular plate, and includes saw-teeth entirely around an outer circumference. A hard tip is attached to a leading end of each of the teeth.

A cover 6 is disposed in a front end of the main pipe 2. This cover 6 is disposed to prevent grass and so on mown by the rotating blade 5 from flying over to an operator.

The drive unit 4 houses a motor 20 (see FIG. 2), which is a driving source to rotationally drive the rotating blade 5, a gear mechanism configured to transmit rotation of the motor 20 to an output shaft, and so on. The rotating blade 5 is detachably attached to the output shaft.

The motor 20 is an IPM (Interior Permanent Magnet) three-phase brushless motor, having a magnet embedded in the rotor 22. The drive of the motor 20 is controlled by a controller 30 (see, FIG. 2) in the control unit 3.

The handle 7 is coupled to the main pipe 2 near an intermediate position of the main pipe 2 along the length of the main pipe 2. The operator holds the handle 7 to mow grass with the electric working machine 1. In the present embodiment, the handle 7 includes a so-called U-shaped handle with grips on both ends. The handle 7 may also be a different type of handle such as a loop handle.

One of two grips of the handle 7 includes a manipulation/display unit 8 configured to be manipulated by the operator with his fingers and also configured so that the operator can confirm an operation status.

The manipulation/display unit 8 includes a trigger switch 10, a lock-off switch 12, and a display panel 14.

The display panel 14 is configured to display rotation status of the motor 20, remaining energy of a battery pack 18 (amount of electric power left in a battery in the battery pack 18), and so on. The display panel 14 includes a manipulation switch configured to be manipulated by the operator to set a rotational direction and so on of the motor 20 (in other words, of the rotating blade 5).

As shown in FIG. 1, the battery pack 18 is detachably attached to a rear end of the control unit 3 and supplies the control unit 3 with direct current (DC) power.

The trigger switch 10 is a manipulation switch configured to input a drive command to drive the motor 20. The lock-off switch 12 enables manipulation of the trigger switch 10 by a pressing manipulation by the operator.

The trigger switch 10 and the display panel 14 are coupled to the controller 30 in the control unit 3 via a cable 19. The controller 30 monitors status of manipulation on the trigger switch 10 and the display panel 14, and drives the motor 20, changes the rotational direction, or puts a display on the display panel 14.

Figure 2:
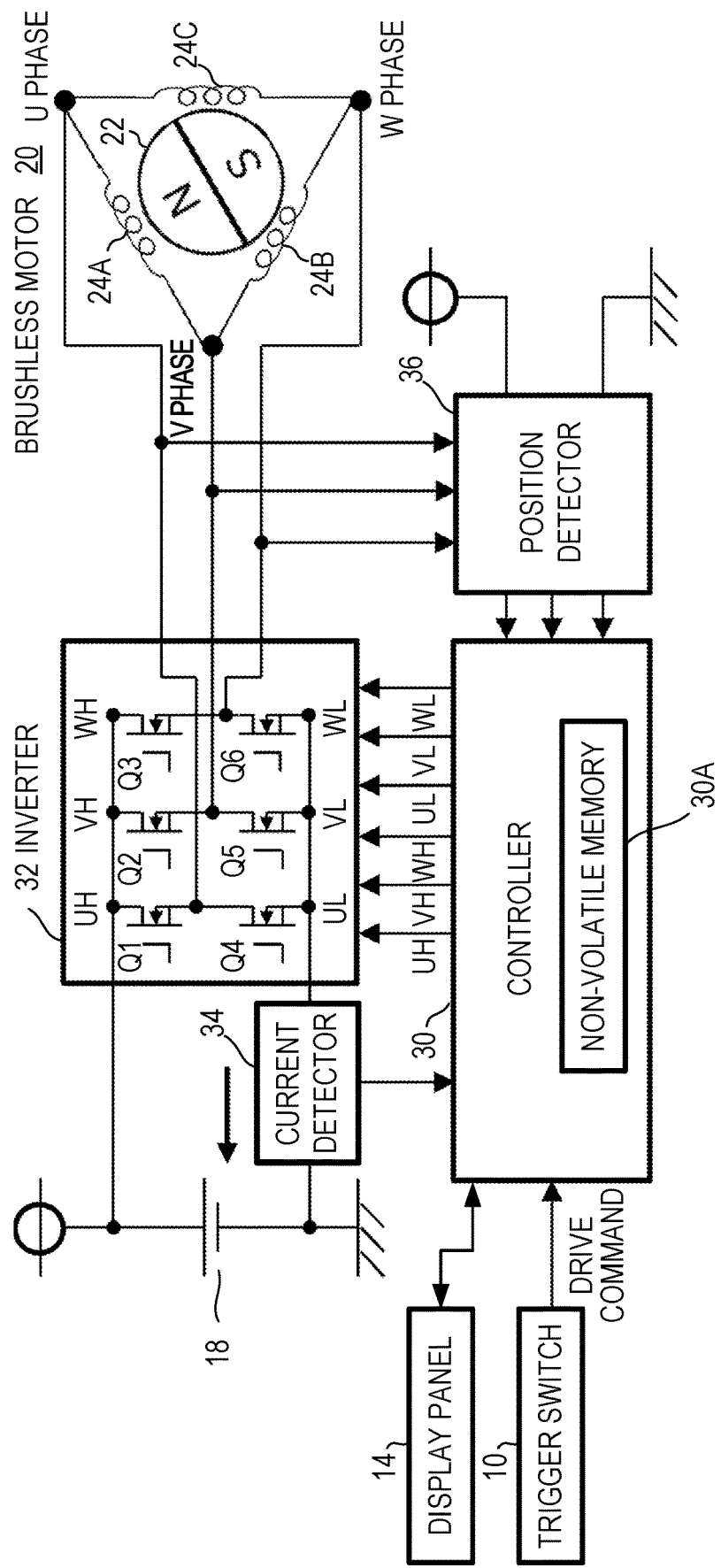
FIG. 2 is a block diagram showing an electric configuration of an electric working machine according to a first embodiment.

As shown in FIG. 2, the control unit 3 includes, in addition to the controller 30, an inverter 32 configured to conduct electricity to the motor 20.

The inverter 32 includes a three-phase full-bridge circuit and is configured to receive electric power supply from the battery pack 18 (more specifically, from the battery in the battery pack 18) and to conduct electric current to windings 24A, 24B, 24C each wound around a stator of a corresponding phase of the motor 20.

More specifically, the inverter 32 includes six switching elements Q1 to Q6, each including MOSFET.

Three of the switching elements Q1 to Q3 in the inverter 32 are separately disposed as so-called high-side switches between three terminals, namely of U-phase, V-phase, and W-phase of the motor 20, and a power line coupled to a positive side of the battery pack 18.

The remaining three switching elements Q4 to Q6 are separately disposed as so-called low-side switches between the terminals of the motor 20 and a ground line coupled to a negative side of the battery pack 18.

In a conduction path to the motor 20 between the inverter 32 and the negative side of the battery pack 18, a current detector 34 configured to detect electric current that had flown to the motor 20 is disposed. The current detector 34 inputs current detection signals to the controller 30.

The control unit 3 includes a position detector 36 configured to detect a rotational position of the motor 20 (more specifically, of the rotor) from a terminal voltage at each of the U, V, and W phases of the motor 20 when the motor 20 is driven in a high-speed mode.

The position detector 36 obtains an induced voltage from the terminal at each of the U, V, and W phases of the motor 20, compares the induced voltage with a reference voltage generated from a power supply voltage, and detects a given rotational position of the motor 20 when the induced voltage crosses the reference voltage.

Figure 3:
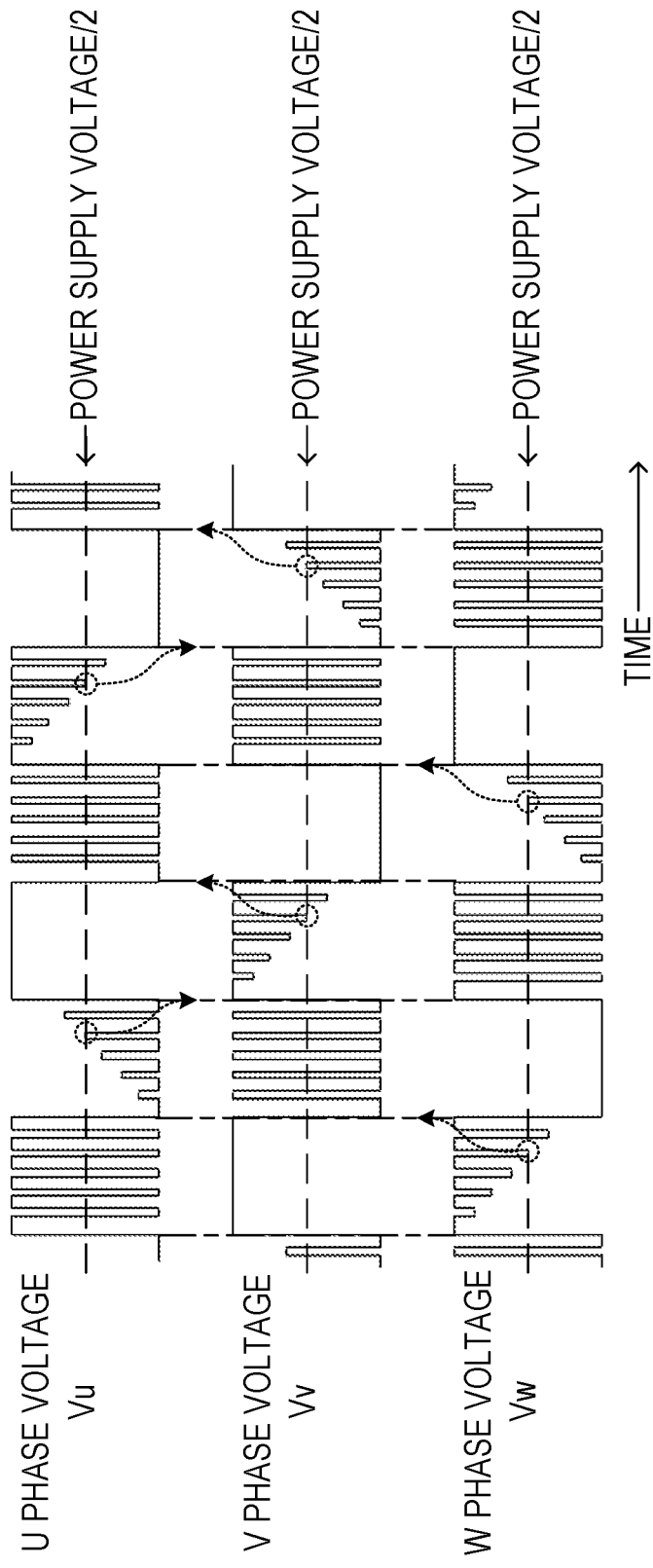
FIG. 3 is a diagram describing a current conduction pattern for conducting electricity to a motor in a high-speed mode.

In other words, in the high-speed mode, as shown in FIG. 3, one switch from the high-side switches Q1 to Q3 and one switch from the low-side switches Q4 to Q6 in the inverter 32 are sequentially selected for conducting electricity, whereby the current conduction path to the windings of each phase of the motor 20 as well as the direction of current flow are switched.

Every time this switching occurs, one of the three terminals of the motor 20 is placed into an open state, and the induced voltage is generated in the open terminal due to the rotation of the motor 20. This induced voltage fluctuates from the positive side to the negative side of the inverter 32, or in the opposite direction. The rotational position of the motor 20 can be identified by detecting the median value of the fluctuation in the induced voltage.

Accordingly, the position detector 36 produces the reference voltage, which is the median value of the fluctuation in the induced voltage, by dividing the power supply voltage into a half and compares this reference voltage with terminal voltages Vu, Vv, and Vw, respectively of the U phase, V phase, and W phase of the motor 20, using a comparator.

When an output from the comparator, which compares the induced voltage obtained from the terminal placed into the open state with the reference voltage, is reversed, the position detector 36 can determine that the induced voltage has crossed the reference voltage.

The position detector 36 then detects a timing at which the induced voltage crosses the reference voltage as a zero crossing point. The controller 30 is configured to identify the rotational position of the motor 20 from the zero crossing point.

As shown in FIG. 3, in the present embodiment, when driving the motor 20 by applying a positive or negative voltage to the terminal of each of the U, V, and W phases in the motor 20, the conduction current to the motor 20 is controlled by performing the PWM control of the applied voltage to each terminal in the second half of the time that the voltage is applied to the terminal. Hereinafter, this driving method is referred to as a second-half PWM drive.

The controller 30 includes a microcomputer including a CPU, a ROM, a RAM, and so on.

The controller 30 activates an initial drive by conducting electricity to the motor 20 with a given current conduction pattern in response to a manipulation on the trigger switch 10 and an input of a drive command to drive the motor 20. After the initial drive, the controller 30 obtains the rotational position and the rotational frequency (more specifically, a rotational speed that is the rotational number per unit time) of the motor 20 based on a detected signal delivered from the position detector 36 and continues to drive the motor 20.

The position detector 36 detects the rotational position of the motor 20 based on the induced voltage that is obtained from the terminals of the U, V, and W phases of the motor 20. Thus, the rotational position may not be accurately detected due to a decrease in the induced voltage when the motor 20 is rotating at a low speed.

The controller 30 is configured to drive the motor 20 in a low-speed mode after the initial drive of the motor 20 until the rotational frequency of the motor 20 reaches a reference rotational frequency $N^{th}$ and to drive the motor 20 in the high-speed mode once the rotational frequency of the motor 20 reaches and exceeds the reference rotational frequency $N^{th}$.

In other words, the controller 30 drives the motor 20 while detecting the rotational position of the motor 20 by driving the motor 20 in the aforementioned second-half PWM drive in the high-speed mode and driving the switching elements Q1 to Q6 of the inverter 32 with switching patterns shown in FIG. 4B in the low-speed mode.

The switching patterns shown in FIG. 4B each specify the switching elements (Q1 to Q6) to be placed in the on state in the inverter 32 in every rotation range, which is determined by dividing one rotation of the rotor 22 in every 60 degrees as shown in FIG. 4A. The switching patterns are stored in a non-volatile memory 30A in the controller 30.

The switching pattern is set individually for each rotational direction of the motor 20, namely Plus (+) and Minus (−) directions. In addition, two patterns capable of generating a rotational torque on the rotor 22 of the motor 20 are preset as the switching patterns for each rotation range and for each rotational direction.

The controller 30 alternately switches the switching pattern to one of the two patterns (pattern 1, pattern 2) synchronously with a control period of performing the PWM control of the motor 20, and accordingly places the switching elements Q1 to Q6 of the inverter 32 in the on state.

Consequently, the terminals of the U, V, and W phases of the motor 20 specified by the switching pattern gain Plus (UH, VH, WH) or Minus (UL, VL, WL) electric potential, which allows current to flow through windings 24A to 24C between the terminals and which in turn generates the rotational torque on the rotor 22.

A conduction term to conduct electricity to the motor 20 per one period of the PWM control (on-time) is determined depending, for example, on a target rotational frequency of the motor 20 and so on. The conduction term becomes shorter as the rotational frequency of the motor 20 becomes lower.

If the switching pattern is alternately switched between pattern 1 and pattern 2 synchronously with the PWM control period, the current detected in the current detector 34 changes in accordance with the rotational position of the motor 20.

Based on this change in the current caused by the switching of the switching pattern, the controller 30 detects the rotational position of the motor 20 (the rotor 22) and identifies a commutation timing to switch the switching pattern for every rotation range.

In the brushless motor, the change in the current caused by the switching of the switching pattern is resulting from a change in inductance due to a difference in magnetic permeability caused by a magnet placed in the rotor 22 (so-called saliency of rotor) albeit the same rotational position.

More specifically, in the switching patterns shown in FIG. 4B, for example, to rotate the motor 20 in the positive direction when the rotational position (rotor position) of the motor 20 is at 330 degrees, electricity is conducted to the windings 24B, 24C with pattern 1 through the paths from the terminals of the U phase and V phase to the terminal of the W phase. With pattern 2, electricity is conducted to the windings 24A, 24B through the path from the terminal of the V phase to the terminals of the U phase and W phase.

Figure 5:
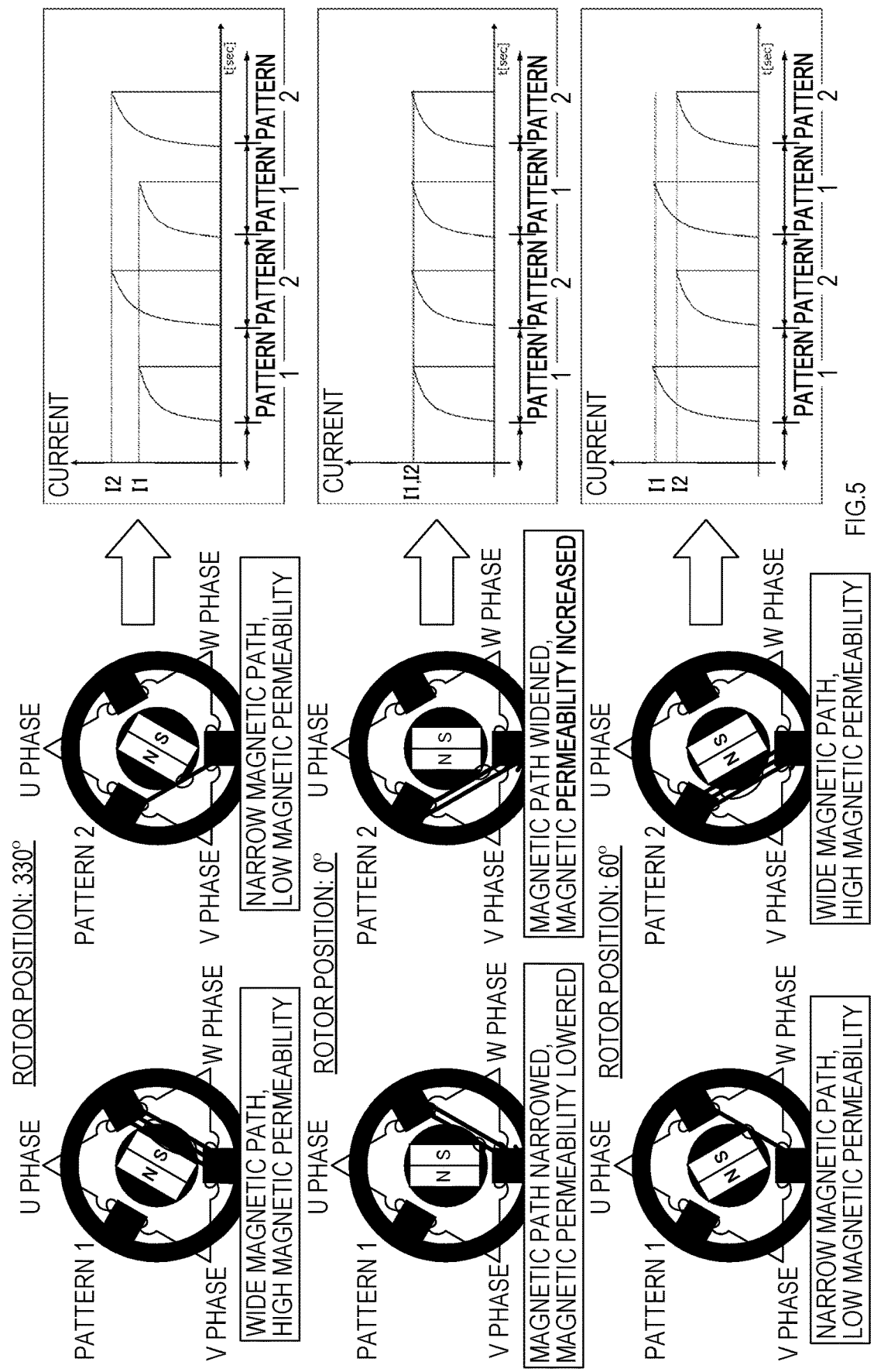
FIG. 5 is a diagram illustrating changes in electric current due to switching of switching patterns in the low-speed mode.

As shown in FIG. 5, as a result of thus conducting electricity to the windings 24B, 24C or to the windings 24A, 24B of the motor 20 with pattern 1 or pattern 2 as mentioned above, pattern 1 provides a wide magnetic path and thus a high magnetic permeability, and pattern 2 provides a narrow magnetic path and thus a low magnetic permeability. Consequently, the current detected in the current detector 34 is greater with pattern 2 (current I2) than with pattern 1 (current I1).

When rotating the rotor 22 in the positive direction without switching the switching pattern from above, the magnetic permeability with pattern 1 agrees with the magnetic permeability with pattern 2 when the rotational position is at zero degrees, and thus the current I1 and the current I2 agree with each other. In addition, when the rotational position is at 60 degrees, the magnitude relation of the magnetic permeability between pattern 1 and pattern 2 is reversed, and thus the magnitude relation between the current I1 and the current I2 is also reversed.

Thus, in the low-speed mode, the current I1 and the current I2 are monitored by alternately switching the switching pattern to perform the PWM drive of the motor 20 between pattern 1 and pattern 2 for every rotation range of 60 degrees.

A reverse timing at which the magnitude relation between the current I1 and the current I2 is reversed is detected as the given rotational position of the motor 20 (for example, rotor position: 0 (zero) degrees). The detected reverse timing is used to identify the timing to switch the switching pattern for every rotation range (in other words, the commutation timing).

Hereinafter, a control process executed in the controller 30 to drive the motor 20 as mentioned above will be explained with reference to flowcharts shown in FIG. 6 to FIG. 10.

In the explanations hereinafter, the drive of the motor 20 in the low-speed mode is referred to as a patterned PWM drive. Also, the rotational position of the motor 20 is simply referred to as a rotor position.

Figure 6:
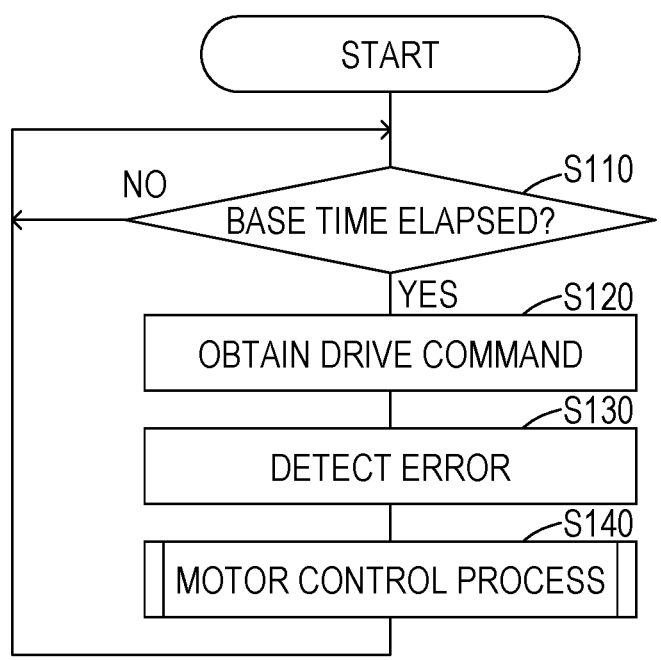
FIG. 6 is a flowchart showing a motor control process executed by a controller.

As shown in FIG. 6, this control process is executed by repeating processes from S120 to S140 (S stands for step) in a given control period.

More specifically, the controller 30 waits for the given control period to be completed by determining whether a reference time (base time) of the control period has elapsed in S110. If the controller 30 determines that the reference time (base time) has elapsed in S110, then the controller 30 proceeds to S120.

In S120, the controller 30 executes a drive command obtaining process to obtain a drive command from the trigger switch 10 or the manipulation switch of the display panel 14. In S130, the controller 30 executes an error detection process to detect an abnormality in the aforementioned components in the manipulation/display unit 8, the motor 20, or the battery pack 18. In subsequent S140, the controller 30 executes a motor control process to drive or stop the motor 20 and then proceeds to S110.

Figure 7:
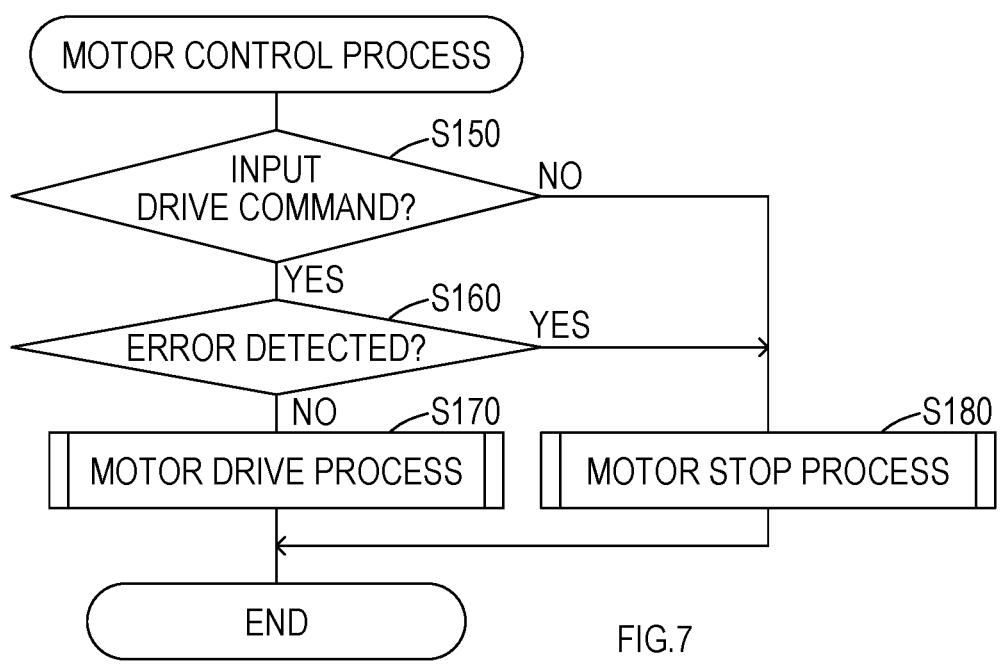
FIG. 7 is a flowchart showing the motor control process shown in FIG. 6.

As shown in FIG. 7, in the motor control process in S140, the controller 30 first determines in S150 whether the drive command to drive the motor 20 is currently inputted based on a result of the drive command obtaining process in S120.

If the controller 30 determines that the drive command has been inputted in S150, then the controller 30 proceeds to S160 and determines whether any abnormality (error) is currently occurring based on a result of the detection in the error detection process in S130.

If the controller 30 determines that no drive command has been inputted in S150 or that some error has occurred in S160, then the controller 30 proceeds to S180, executes a motor stop process to stop the motor 20, and ends the motor control process.

If the controller 30 determines in S160 that no error has occurred, then the controller 30 proceeds to S170, executes a motor drive process to drive the motor 20, and ends the motor control process.

Figure 8:
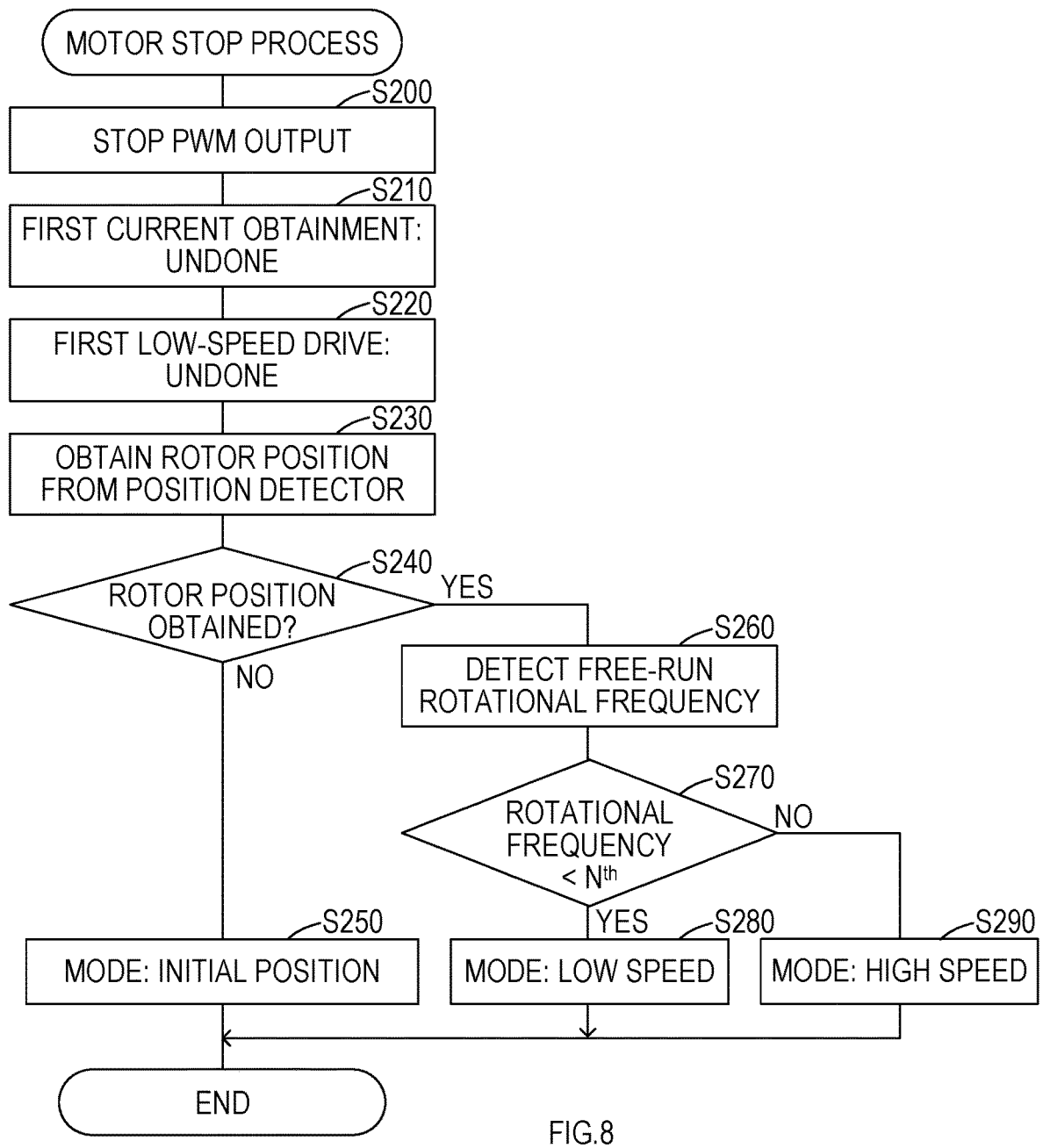
FIG. 8 is a flowchart showing a motor stop process shown in FIG. 7.

As shown in FIG. 8, in the motor stop process in S180, the controller 30 stops output of drive signals (PWM output) to the inverter 32 in S200 to stop the second-half PWM drive or the patterned PWM drive of the motor 20.

In subsequent S210 and S220, the controller 30 sets both a flag for a first current obtainment and a flag for a first low-speed drive to "Undone" and proceeds to S230.

In S230, the controller 30 obtains the rotor position from the position detector 36, and determines in S240 whether the rotor position has been successfully detected via the position detector 36. In other words, since the position detector 36 cannot detect the rotor position when the motor 20 is rotating at an extremely low-speed, the controller determines whether the motor 20 has substantially stopped in S240 based on whether the rotor position has been detected.

If the controller 30 determines in S240 that the rotor position has not successfully been detected with the position detector 36, then the controller 30 proceeds to S250, sets an operation mode of the controller 30 to an initial position mode, and ends the motor stop process.

If the controller 30 determines in S240 that the position detector 36 has successfully detected the rotor position, then the controller 30 proceeds to S260 and detects a free-run rotational frequency of the motor 20 based on, for example, changes in the terminal voltage of the motor 20 detected with the position detector 36.

In subsequent S270, the controller 30 determines whether the rotational frequency detected in S260 is lower than the reference rotational frequency $N^{th}$ for high-speed determination. If the rotational frequency is lower than the reference rotational frequency $N^{th}$, then the controller 30 proceeds to S280, sets the operation mode to the low-speed mode, and ends the motor stop process.

If the controller 30 determines in S270 that the rotational frequency is equal to or higher than the reference rotational frequency $N^{th}$, then the controller 30 proceeds to S290, sets the operation mode to the high-speed mode, and ends the motor stop process.

Figure 9:
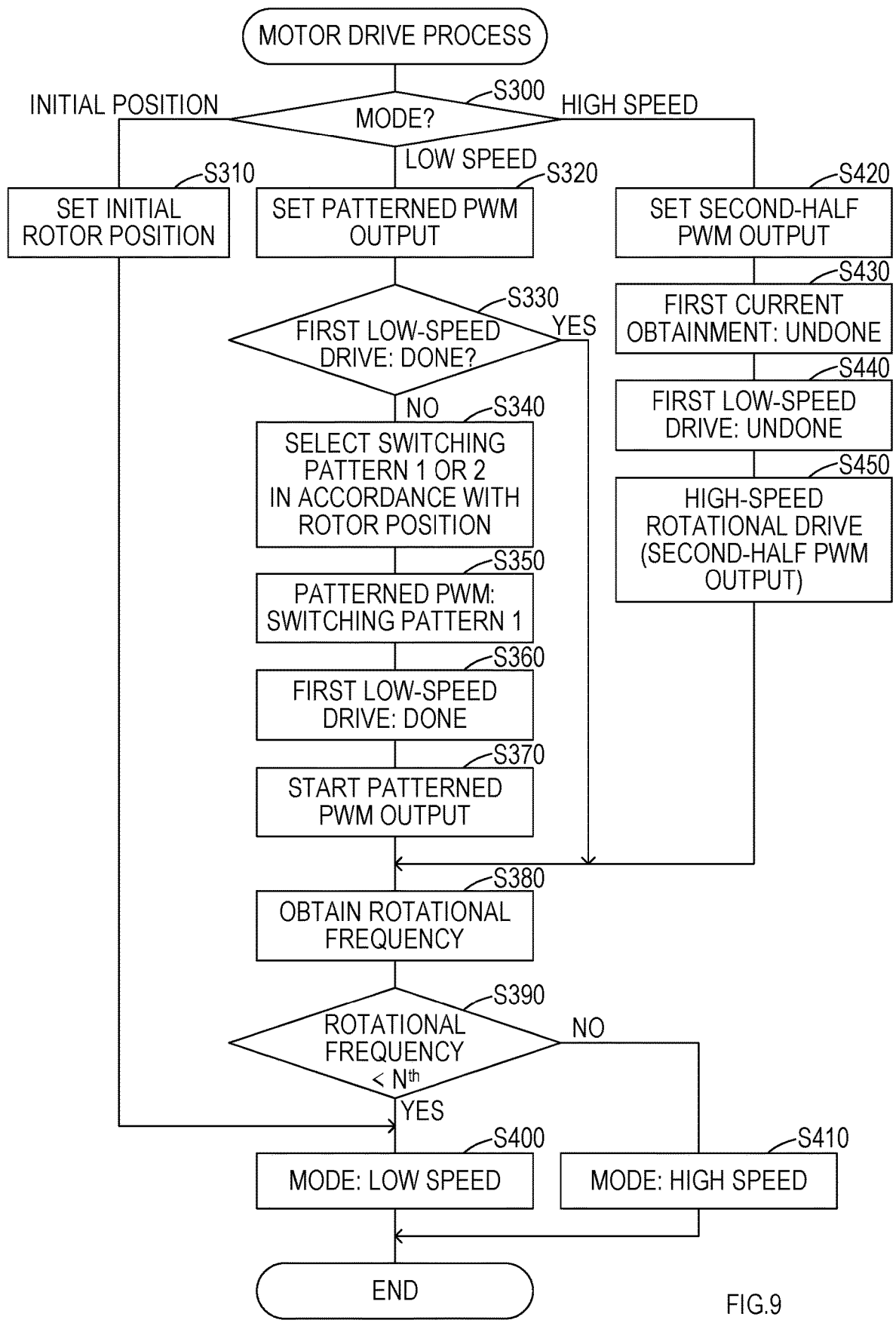
FIG. 9 is a flowchart showing a motor drive process shown in FIG. 7.

As shown in FIG. 9, in the motor drive process in S170, the controller 30 first determines in S300 whether the operation mode is the aforementioned initial position mode, the low-speed mode, or the high-speed mode.

If the operation mode is the initial position mode, the controller 30 sets the rotor position to a predefined initial position in S310 and proceeds to S400. In S310, for example, the controller 30 sets the rotor position to the initial position by conducting electricity to a given winding of the motor 20 via the inverter 32.

If the controller 30 determines in S300 that the operation mode is the low-speed mode, then the controller 30 sets an output method of the drive signal to the inverter 32 to a patterned PWM output in S320 to rotate the motor 20 at a low speed with the patterned PWM drive, and then proceeds to S330.

In S320, the controller 30 changes the output method of the drive signal to the patterned PWM output when the output method is set to a second half PWM output to drive the motor 20 by the second-half PWM drive. If the output method is already set to the patterned PWM output, the controller 30 leaves the output method unchanged and proceeds to S330.

In S330, the controller 30 determines whether the low-speed drive of the motor 20 has already been executed by determining whether the first low-speed drive flag is set to "Done".

If the first low-speed drive flag is set to "Done" and the low-speed drive has already been initiated, then the controller 30 proceeds to S380. If the first low-speed drive flag is set to "Undone" and the low-speed drive has not been initiated yet, the controller 30 proceeds to S340.

In S340, in accordance with the setting specifics shown in FIG. 4B, the controller 30 selects two switching patterns (pattern 1 and pattern 2) necessary to drive the motor 20 at a low speed based on the present rotor position and the rotational direction of the motor 20.

In subsequent S350, the controller 30 sets one of the two switching patterns selected in S340 (pattern 1 in this example) as a PWM pattern for driving the motor 20 at a low-speed via the inverter 32 and proceeds to S360.

In S360, the controller 30 sets the first low-speed drive flag to "Done". In subsequent S370, the controller 30 starts outputting the drive signal to the inverter 32 (patterned PWM output) with pattern 1 that is set as the PWM pattern in S350.

In response to the initiation of the patterned PWM output in S370, the drive signal corresponding to pattern 1 is transmitted to the inverter 32 at an on-timing that occurs in every control period (a given period of time) of the PWM control, which then places a part of the switching elements Q1 to Q6 in the on state.

If the controller 30 determines in S300 that the operation mode is the high-speed mode, then the controller 30 proceeds to S420 to drive the motor 20 at a high speed by the aforementioned second-half PWM drive and sets the output method of the drive signals to the inverter 32 to the second half PWM output.

In subsequent S430 and S440, the controller 30 sets the flag for the first current obtainment and the flag for the first low-speed drive, which are used for driving the motor 20 in the low-speed mode by the PWM pattern, to "Undone" and proceeds to S450.

In S450, the controller 30 executes a high rotational drive (the second-half PWM drive) to rotate the motor 20 at a high speed with a current conduction pattern for high-speed drive shown in FIG. 3 and proceeds to S380.

In S380, the controller 30 obtains the rotational frequency of the motor 20. More specifically, in the low-speed mode, the controller 30 calculates the rotational frequency of the motor 20 from an interval to update a rotor position in a PWM carrier interruption process, which will be mentioned later; and in the high-speed mode, the controller 30 obtains the rotational frequency of the motor 20 from the position detector 36.

In subsequent S390, the controller 30 determines whether the rotational frequency obtained in S380 is lower than the reference rotational frequency $N^{th}$ for high-speed determination. If the rotational frequency is lower than the reference rotational frequency $N^{th}$, the controller 30 proceeds to S400, sets the operation mode to the low-speed mode, and ends the motor drive process.

If the controller 30 determines in S390 that the rotational frequency is equal to or higher than the reference rotational frequency $N^{th}$, then the controller 30 proceeds to S410, sets the operation mode to the high-speed mode, and ends the motor drive process.

The PWM carrier interruption process executed in the controller 30 will now be explained. The PWM carrier interruption process is executed once in a single period of the PWM control in response to a timing-signal (carrier) transmitted from an oscillator or a timer in every single period of the PWM control when the PWM control of the motor 20 is performed.

More specifically, the PWM carrier interruption process is executed not at the on-timing, which is to transmit the drive signals to the inverter 32 by the PWM control to place the switching elements in the on state, but at an off-timing, which is to turn off the switching elements after the given on-time has elapsed.

The PWM carrier interruption process is for updating the rotor position based on the current value detected in the current detector 34 to change (commutate) the current conduction pattern to the motor 20 when driving the motor 20 in the low-speed mode with the patterned PWM drive.

Figure 10:
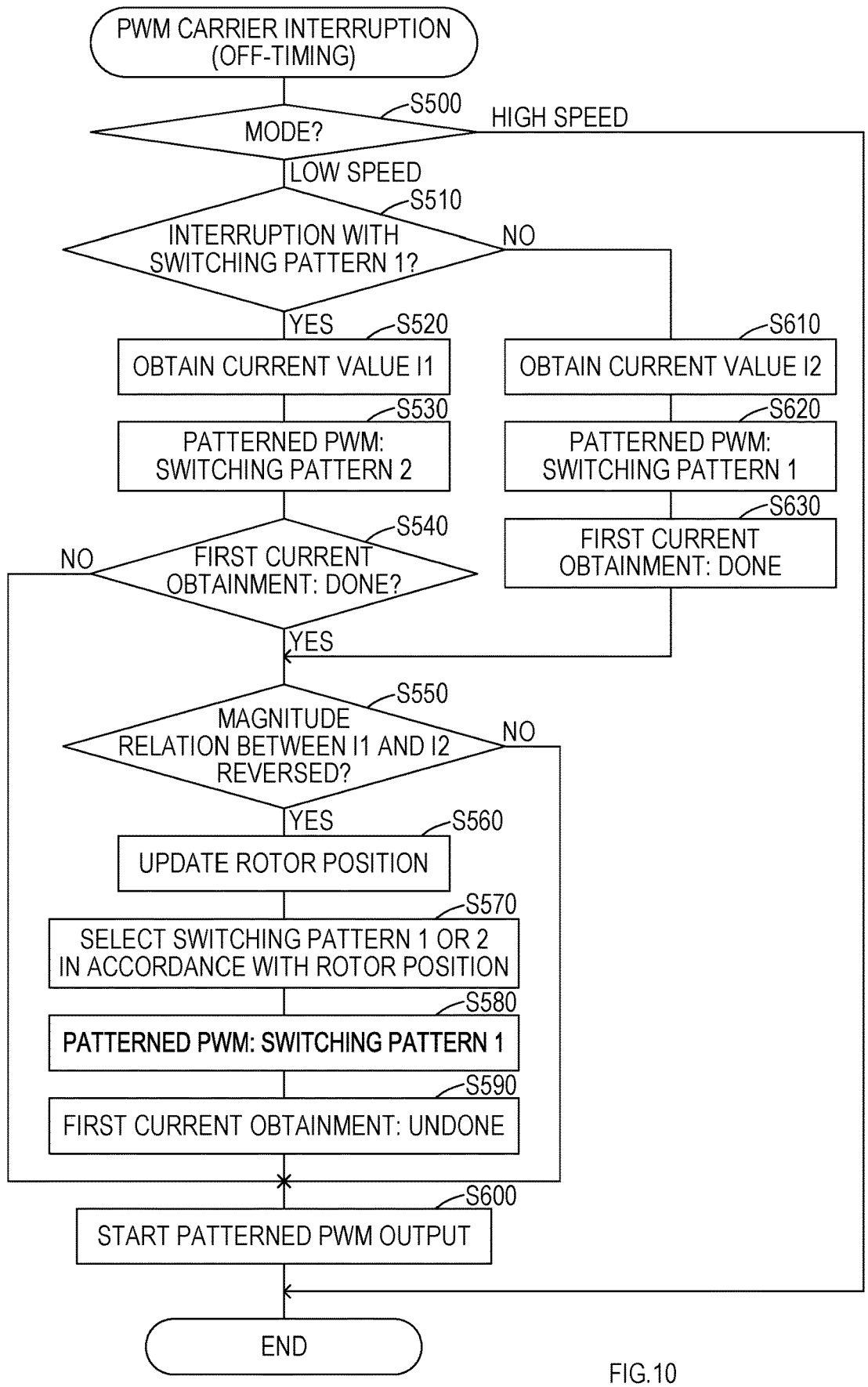
FIG. 10 is a flowchart showing a PWM carrier interruption process executed by the controller at an off-timing.

As shown in FIG. 10, in the PWM carrier interruption process, the controller 30 first determines in S500 whether the present operation mode is the low-speed mode or the high-speed mode, and ends the PWM carrier interruption process if the present operation mode is the high-speed mode.

If the controller 30 determines in S500 that the operation mode is the low-speed mode, then the controller 30 proceeds to S510 and determines whether the ongoing interruption is an interruption with the switching pattern being pattern 1, or an interruption with the switching pattern being pattern 2.

The controller 30 proceeds to S520 when the switching pattern is pattern 1, obtains a current value I1 that is detected in the current detector 34 when the inverter 32 is driven with the current pattern 1, and proceeds to S530.

In S530, the controller 30 changes the switching pattern for the PWM pattern to pattern 2, proceeds to S540, and determines whether the first current obtainment flag is set to "Done".

If the first current obtainment flag is not set to "Done", as it means that current conduction with the switching pattern (pattern 1) in the present rotor position (rotation range) has just started, the controller 30 proceeds to S600. If the first current obtainment flag is set to "Done", the controller 30 proceeds to S550.

If the controller 30 determines in S510 that the ongoing interruption is an interruption with the switching pattern being pattern 2, then the controller 30 proceeds to S610. In S610, the controller 30 obtains a current value I2 that is detected in the current detector 34 when the inverter 32 is driven with the currently set pattern 2, and proceeds to S620.

In S620, the controller 30 changes the switching pattern for the PWM pattern to pattern 1, proceeds to S630, sets the first current obtainment flag to "Done", and then proceeds to S550.

In S550, the controller 30 determines the magnitude relation between the latest current value I1 and the latest current value I2 respectively obtained in S520 and S610 and determines whether the magnitude relation has been reversed.

As shown in FIG. 5, the magnitude relation between the current value I1 and the current value I2 changes depending on the rotation of the rotor 22 and is reversed at a given rotational position (at zero degrees of the rotor position in the drawings).

Thus, in S550, the controller 30 determines whether the rotor 22 has passed the given rotational position (for example, reference angles of zero degrees, 60 degrees, 120 degrees, 180 degrees, 240 degrees, and 300 degrees) by determining whether the magnitude relation between the current value I1 and the current value I2 has been reversed.

If the controller 30 determines in S550 that the magnitude relation between the current value I1 and the current value I2 has not been reversed, the controller 30 proceeds to S600. If the controller 30 determines that the magnitude relation between the current value I1 and the current value I2 has been reversed, the controller 30 proceeds to S560 and updates the rotor position.

At the first determination of whether the magnitude relation between the current value I1 and the current value I2 has been reversed in S550, the previous magnitude relation is unknown. Thus, as shown in FIG. 4B, an initial state of the magnitude relation is set for every rotation range and every rotational direction of the motor 20 and is stored in the non-volatile memory 30A disposed in the controller 30 along with the switching patterns.

In S570, the controller 30 selects the switching patterns (pattern 1, pattern 2) to drive the motor 20 at a low speed in accordance with the updated rotor position.

In S580, the controller 30 sets one of the two selected switching patterns (pattern 1 in this embodiment) as the PWM pattern to drive the motor 20 at a low speed via the inverter 32, and proceeds to S590.

In S590, the controller 30 sets the first current obtainment flag to "Undone" to newly initiate the motor drive after the update of the rotor position and proceeds to S600.

In S600, the controller 30 initiates the patterned PWM output with the currently set switching pattern (pattern 2 or pattern 1) and ends the PWM carrier interruption process.

As in the case when the output is initiated in S370, the drive signal corresponding to the currently set switching pattern is transmitted to the inverter 32 at the on-timing of the PWM control when initiating the patterned PWM output in S600, thereby to turn on a part of the switching elements Q1 to Q6.

The controller 30 obtains the current values I1 and I2 in S520 and S610 by A/D conversion. The timing for the A/D conversion may preferably be the off-timing of the PWM control to turn off the switching elements of the inverter 32. Alternatively, the A/D conversion may be performed at a given time before the off-timing.

This allows the current values I1 and I2 to be obtained at or near the maximum values of the currents flowing with pattern 1 and pattern 2 as shown in FIG. 5, which consequently increases the difference between the current values I1 and I2 when determining the magnitude relation in S550. As a result, the timing when the magnitude relation between the current value I1 and the current value I2 is reversed (in other words, the rotor position) can be detected with higher accuracy.

As explained above, in the electric working machine 1 in the present embodiment, the controller 30 controls the drive of the motor 20 in accordance with the rotor position that is detected in the position detector 36 based on the induced voltage at a high-speed rotation, in which the rotational frequency of the motor 20 is equal to or greater than the reference rotational frequency $N^{th}$.

When the motor 20 is rotating at a low speed, in which the rotational frequency of the motor 20 is less than the reference rotational frequency $N^{th}$, the controller 30 sets the switching patterns of pattern 1 and pattern 2 as the current conduction pattern for every rotation range to switch the current conduction pattern to the motor 20.

Figure 11:
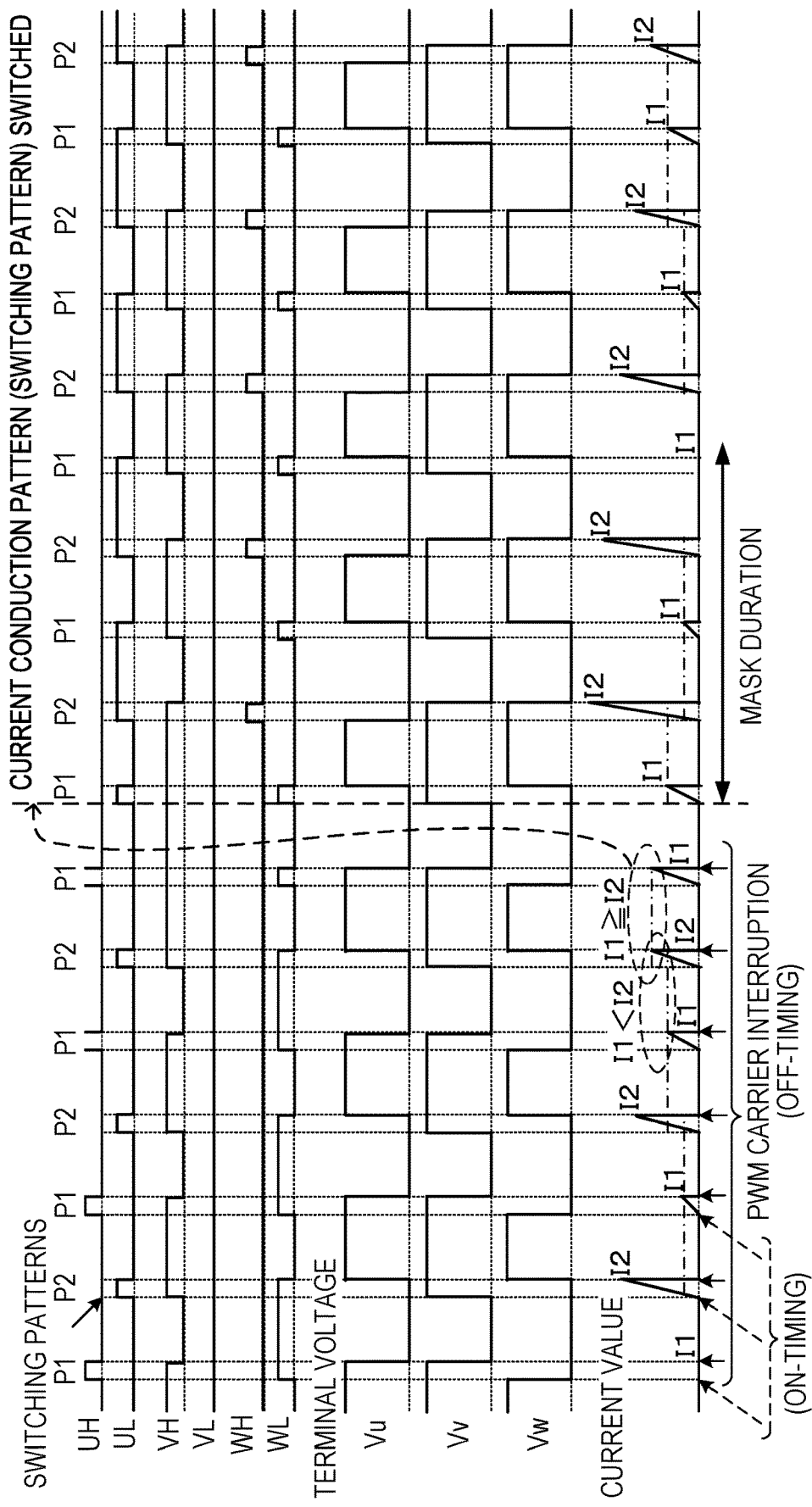
FIG. 11 is a time chart showing an operation of position detection by a current value in the first embodiment.

As shown in FIG. 11, the controller 30 drives the motor 20 by alternately switching the switching pattern between pattern 1 and pattern 2 synchronously with the period of the PWM control. In FIG. 11, P1 represents pattern 1, and P2 represents pattern 2.

When supplying electric current to the motor 20 with pattern 1 and pattern 2, the controller 30 respectively obtains the current values I1 and I2 detected in the current detector 34 at the off-timing of the switching elements. The controller 30 then detects the rotor position from thus obtained magnitude relation between the current value I1 and the current value I2, updates the rotor position, and switches the current conduction pattern (the switching pattern) to the motor 20 in accordance with the updated rotor position.

Therefore, the electric working machine 1 in the present embodiment can accurately detect the rotor position by the aforementioned patterned PWM drive of the motor 20 even when the motor 20 is rotating at a low speed, at which the position detector 36 cannot accurately detect the rotor position.

Accordingly, the electric working machine 1 can recognize the rotational position of the motor 20 in a very wide rotation range, from an extremely low-speed rotation to a high-speed rotation, and appropriately control the current conduction pattern to the motor 20.

The switching pattern for driving the switching elements in the inverter 32 in the low-speed mode is configured to generate rotational torque on the rotor 22 of the motor 20 with both pattern 1 and pattern 2.

The electric working machine 1 in the present embodiment can therefore inhibit lowering of acceleration characteristics of the motor 20 due to an occurrence of drive cessation period as seen in the aforementioned conventional machines, in which no rotational torque is generated on the motor 20 to detect the rotor position during the low-speed drive of the motor 20. The electric working machine 1 in the present embodiment can also inhibit stopping of the rotation of the motor 20 when a load is imposed on the output shaft of the motor 20.

In the present embodiment, the rotor position is detected when the difference between the current values I1 and I2, resulting from switching the switching pattern, is reversed. Thus, it is not necessary to calculate the inductance from the current values I1 and I2 as it has been in the conventional machines. Accordingly, the controller 30 need not include an expensive arithmetic circuit capable of fast calculation but can be implemented with simpler device configuration at lower cost.

<First Modification>

Next, a modification of the first embodiment (first modification) will be explained.

In the present embodiment, the controller 30 obtains the current values I1 and I2 at the off-timing of the switching elements when conducting electricity to the motor 20 with both pattern 1 and pattern 2 of the switching pattern in the low-speed mode, and then detects the rotor position from the magnitude relation between the current values I1 and I2.

Thus, if a reflux current or a regenerative current is flowing through the windings of the brushless motor 20 at the on-timing of the switching elements, then the current values I1 and I2 increase by the amount of the reflux current or the regenerative current, which does not allow an accurate detection of the rotor position from the magnitude relation between the current value I1 and the current value I2.

More specifically, although the conduction path from the battery pack 18 as a direct-current power source to the brushless motor 20 is interrupted at the off-timing of the PWM control, electricity is nevertheless conducted to the brushless motor 20 through well-known parasitic diodes disposed in the switching elements Q1 to Q6.

Figure 12:
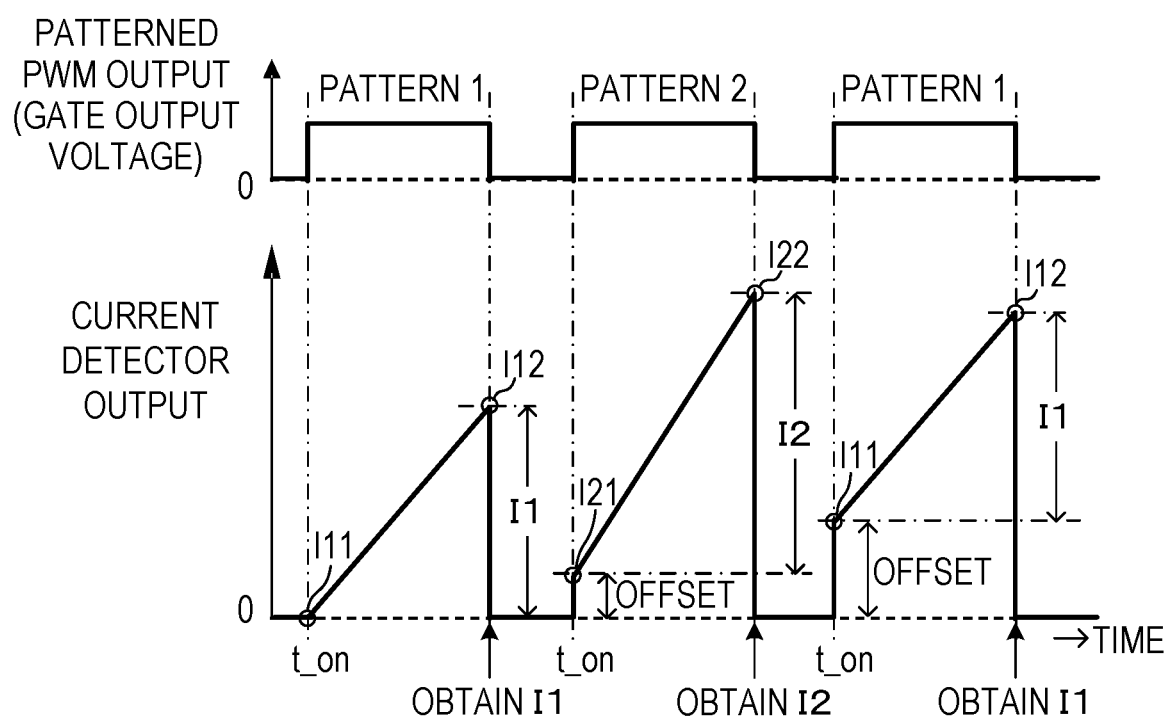
FIG. 12 is a time chart describing an operation of position detection in a first modification.

Unless this electric current (namely, the reflux current or the regenerative current) is reduced to zero by the on-timing of the PWM control, the reflux current or the regenerative current flows through the conduction path from the battery pack 18 to the brushless motor 20 after the on-timing t_on as shown in FIG. 12.

As a result, the current value detected later in the current detector 34 increases by the amount of the reflux current or the regenerative current, and such an increase inhibits an accurate detection of the rotor position from the magnitude relation between the current value I1 and I2 detected at the off-timing.

In the present modification, the controller 30 detects the reflux current or the regenerative current as conduction-start current values I11 and I21 via the current detector 34 at the on-timing t_on of the PWM control and detects conduction-stop current values I12 and I22 via the current detector 34 at the off-timing of the PWM control.

The controller 30 then subtracts thus detected conduction-start current values I11 and I21 as offset values from the conduction-stop current values I12 and I22 respectively, and obtains differences (I12−I11, I22−I21), which are results of the subtraction, respectively as the current values I1 and I2 for the position detection.

Consequently, in the present modification, the rotational position of the brushless motor 20 can be detected without being influenced by the reflux current or the regenerative current even when the brushless motor 20 is driven under the condition that the reflux current or the regenerative current cannot be reduced to zero within one period of the PWM control.

Figure 13:
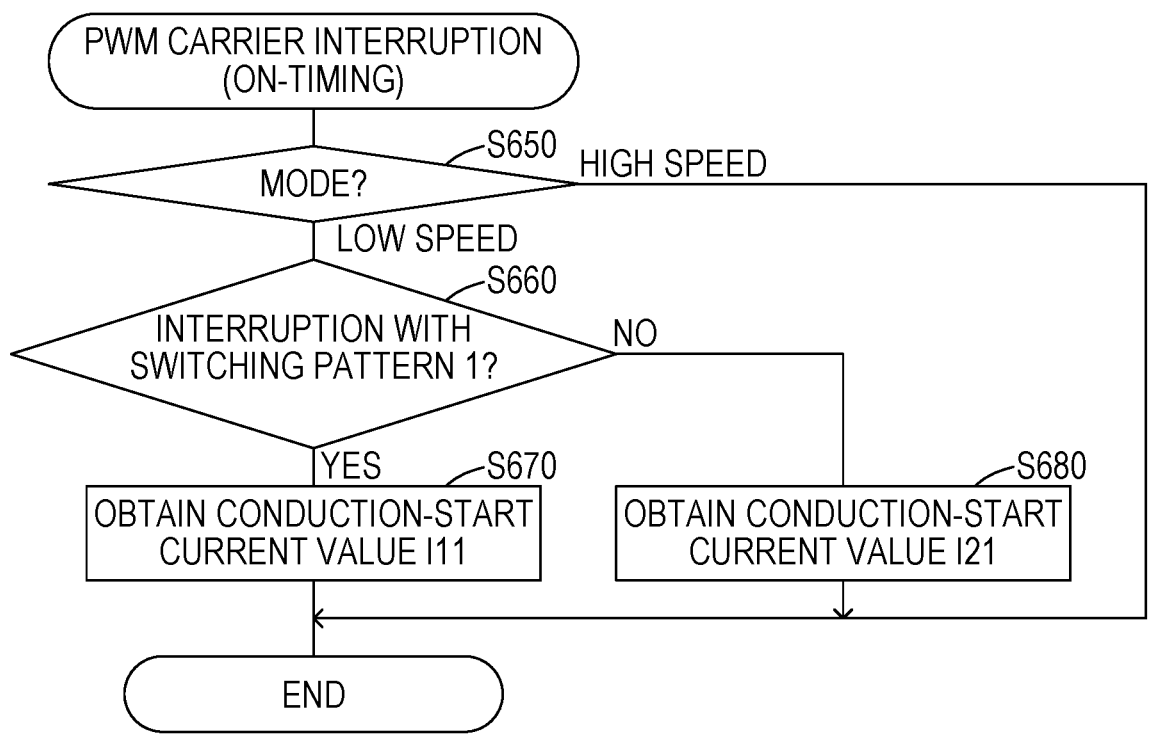
FIG. 13 is a flowchart showing a PWM carrier interruption process at an on-timing in the first modification.

As shown in FIG. 13, to obtain the conduction-start current values I11 and I21 as explained above, the controller 30 executes the PWM carrier interruption process also at the on-timing of the PWM control.

In this PWM carrier interruption process, the controller 30 first determines in S650 whether the present operation mode is the low-speed mode or the high-speed mode. The controller 30 ends the PWM carrier interruption process if the present operation mode is the high-speed mode.

If the controller 30 determines in S650 that the present operation mode is the low-speed mode, the controller 30 proceeds to S660 and determines whether the ongoing interruption is an interruption with the switching pattern being pattern 1, or an interruption with the switching pattern being pattern 2.

If the controller 30 determines in S660 that the switching pattern is pattern 1, then the controller 30 proceeds to S670 and obtains the conduction-start current value I11 via the current detector 34.

If the controller 30 determines in S660 that the switching pattern is pattern 2, the controller 30 proceeds to S680 and obtains the conduction-start current value I21 via the current detector 34. After obtaining the conduction-start current value I11 or I21 as explained above, the controller 30 ends the PWM carrier interruption process.

Figure 14:
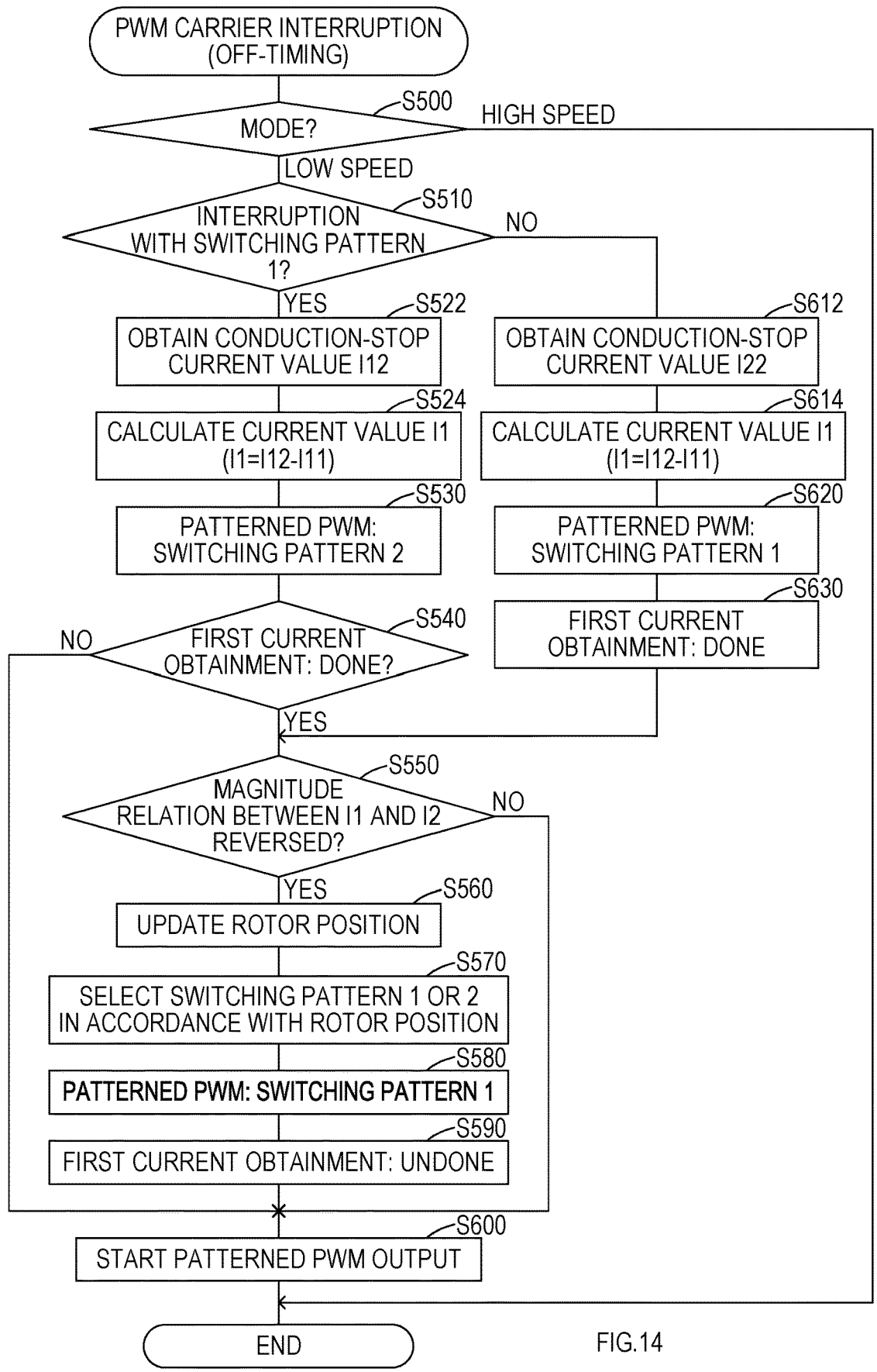
FIG. 14 is a flowchart showing a PWM carrier interruption process at an off-timing in the first modification.

As shown in FIG. 14, in the PWM carrier interruption process executed at the off-timing of the PWM control, the controller 30 executes the processes in S522 and S524 instead of the process in S520 if the controller 30 determines in S510 that the switching pattern is pattern 1.

If the controller 30 determines in S510 that the switching pattern is pattern 2, the controller 30 executes the processes in S612 and S614 instead of the process in S610.

The controller 30 obtains the conduction-stop current value I12 via the current detector 34 in S522, calculates the difference (I12−I11) between the conduction-stop current value I12 and the conduction-start current value I11 as the current value I1 in S524, and then proceeds to S530.

The controller 30 obtains the conduction-stop current value I22 via the current detector 34 in S612, calculates the difference (I22−I21) between the conduction-stop current value I22 and the conduction-start current value I21 as the current value I2 in S614, and then proceeds to S620.

By executing the PWM carrier interruption process at the on-timing and the off-timing of the PWM control, the controller 30 can obtain the current values I1 and I2 that flow when the switching elements in the inverter 32 are placed in the on state without being influenced by the reflux current or the regenerative current. The rotor position can therefore be detected from the magnitude relation between the current value I1 and the current value I2 with increased accuracy in the present modification.

In the present embodiment, the switching patterns for driving the motor 20 with the patterned PWM drive include two patterns, pattern 1 and pattern 2. Nevertheless, as shown in dotted frames in FIG. 4B, the switching patterns may also include pattern 3.

More specifically, the rotor position can be detected in the same manner as the aforementioned embodiment with three or more patterns being included in the switching patterns if the controller 30 alternately switches the switching pattern synchronously with the control period of the PWM control and determines the magnitude relation between the current values that can be obtained before and after every time the switching pattern is switched.

In the present embodiment, the conduction term to conduct electricity to the motor 20 per one period of the PWM control (on-time) for driving the inverter 32 with pattern 1 or pattern 2 to drive the motor 20 at a low speed is determined depending on the target rotational frequency of the motor 20 and so on.

The current that flows through the motor 20 changes depending on the power supply voltage supplied from the battery pack 18; and as the power supply voltage fluctuates, the current values I1 and I2 fluctuate.

Thus, alternatively, the conduction term to conduct electricity to the motor 20 per one period of the PWM control (on-time) for driving the motor 20 at a low speed with each of pattern 1 and pattern 2 may also be set depending on the value of the power supply voltage used for driving the motor 20, such that the on-time is made longer as the voltage value decreases.

This improves precision in the detection of the rotor position by inhibiting fluctuations of the current flowing through the brushless motor due to fluctuations of the power supply voltage when driving the motor 20 with the patterned PWM drive.

Further, in the present embodiment, the magnitude relation between the current values caused by switching the switching pattern is detected by calculation in the microcomputer included in the controller 30.

Alternatively, for example, current values (more preferably, peak current values) detected in the current detector 34 with several switching patterns may be stored in external storage circuits outside of the controller 30, and the current values stored in the respective storage circuits may be compared in a comparison circuit, such as a comparator. In other words, the magnitude relation between the current values caused by switching the switching pattern may be determined in an external circuit outside of the controller 30.

Accordingly, the controller 30 is only required to read the magnitude relation determined in the external circuit to determine whether the magnitude relation is reversed. Thus, a processing load on the controller 30 can be reduced.

Embodiment 2

In the first embodiment, the controller 30 detects the rotor position from the magnitude relation between the current values caused by switching the switching pattern when driving the motor 20 at a low speed with the patterned PWM drive.

The rotor position can be detected from the magnitude relation between the inductances caused by switching the switching pattern.

Accordingly, to detect the rotor position, the controller 30 need not detect the current values by alternately switching the switching pattern between pattern 1 and pattern 2 when driving the motor 20 at a low speed as described in the first embodiment. The controller 30 may measure times for the current values to reach a given threshold value.

An electric working machine explained hereinafter in the second embodiment is configured to measure times for current values to reach a given threshold value and detect the rotor position from the magnitude relation between the measured times.

The electric working machine 1 in the present embodiment is basically configured in the same manner as the first embodiment. Thus, in the following explanation, configurations in common with the first embodiment will be omitted and differences will be focused.

Figure 15:
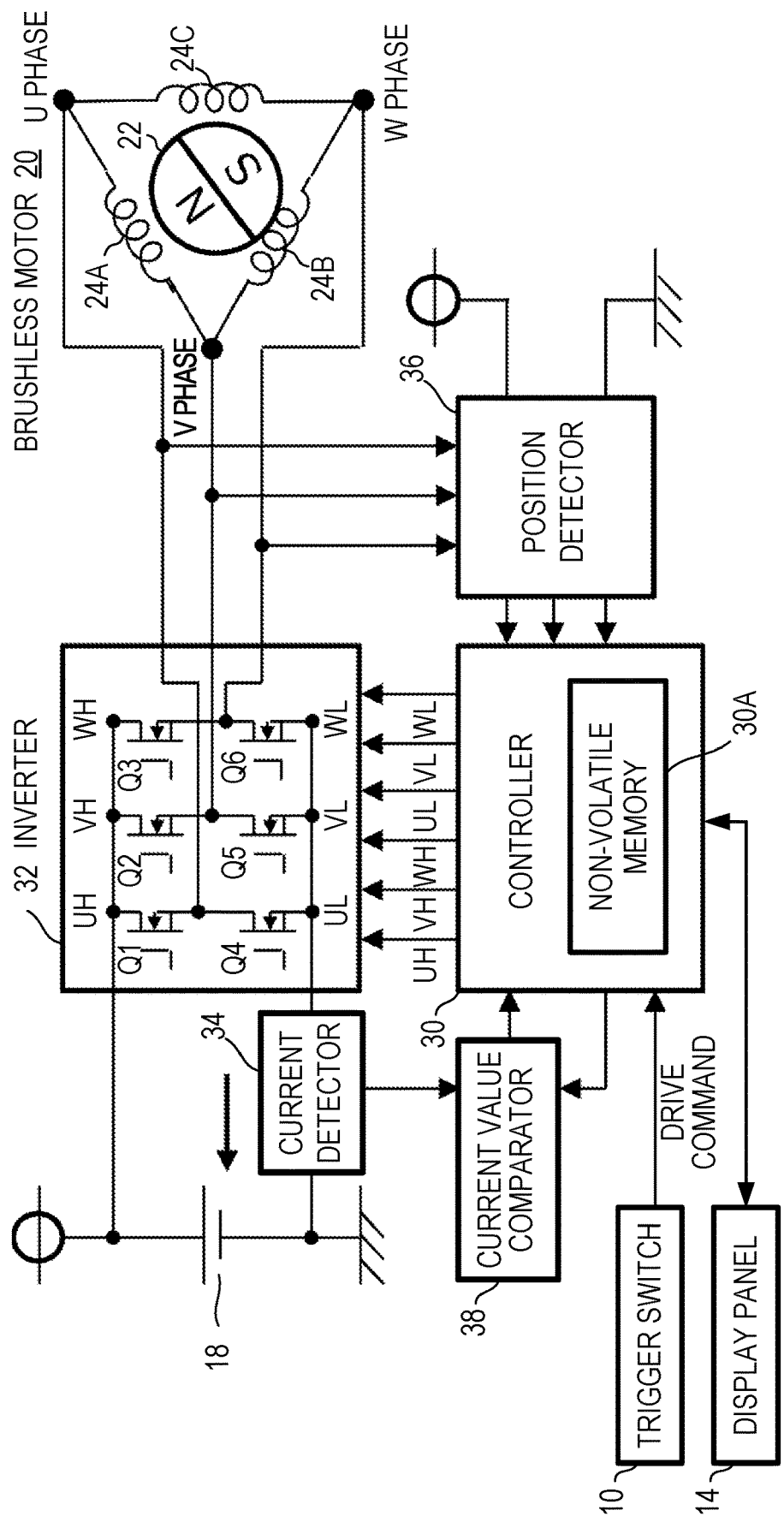
FIG. 15 is a block diagram showing an electric configuration of an electric working machine in a second embodiment.

As shown in FIG. 15, the control unit 3 in the present embodiment includes the controller 30, the inverter 32, the current detector 34, the position detector 36, as well as a current value comparator 38.

The current value comparator 38 is configured to compare the current value detected in the current detector 34 with a reference current value, which is an output from the controller 30 as a threshold value, and output a signal to the controller 30 when the current value, detected as a result of electric conduction to the motor 20, increases and reaches the reference current value.

Figure 18:
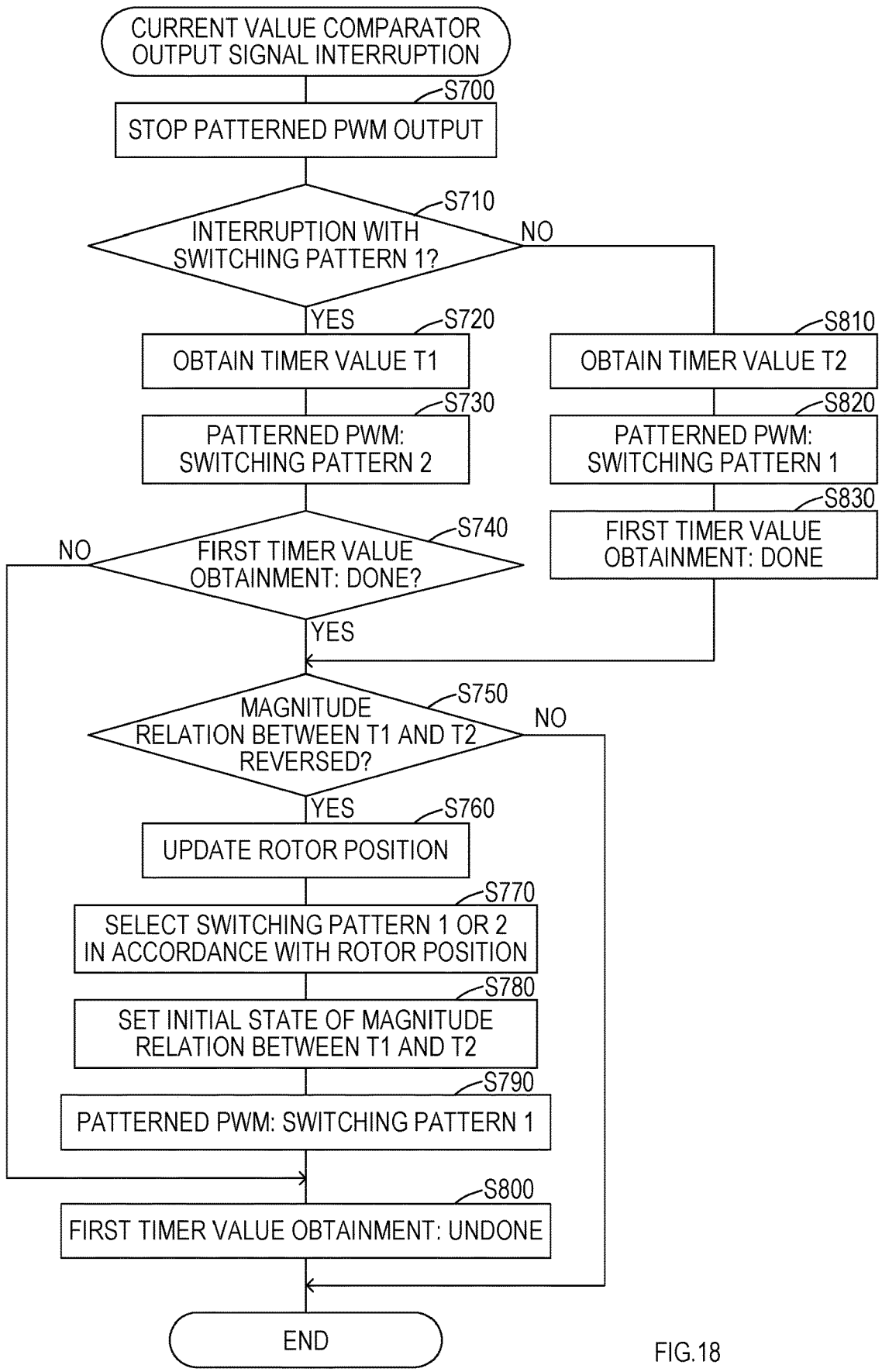
FIG. 18 is a flowchart showing a current value comparator output signal interruption process executed by a controller.
Figure 19:
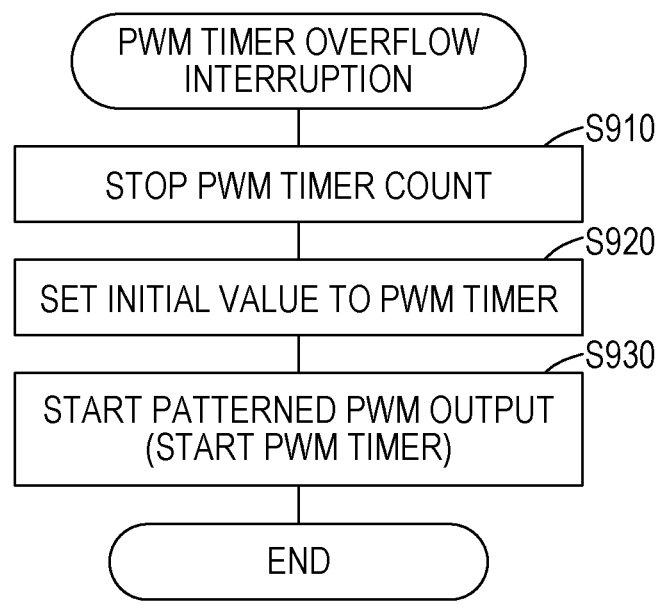
FIG. 19 is a flowchart showing a PWM timer overflow interruption process executed by the controller.

Instead of the PWM carrier interruption process in the first embodiment, the controller 30 executes a current value comparator output signal interruption process shown in FIG. 18 and a PWM timer overflow interruption process shown in FIG. 19. A PWM timer is a time counter for measuring a time for a single period of the PWM control.

Figure 16:
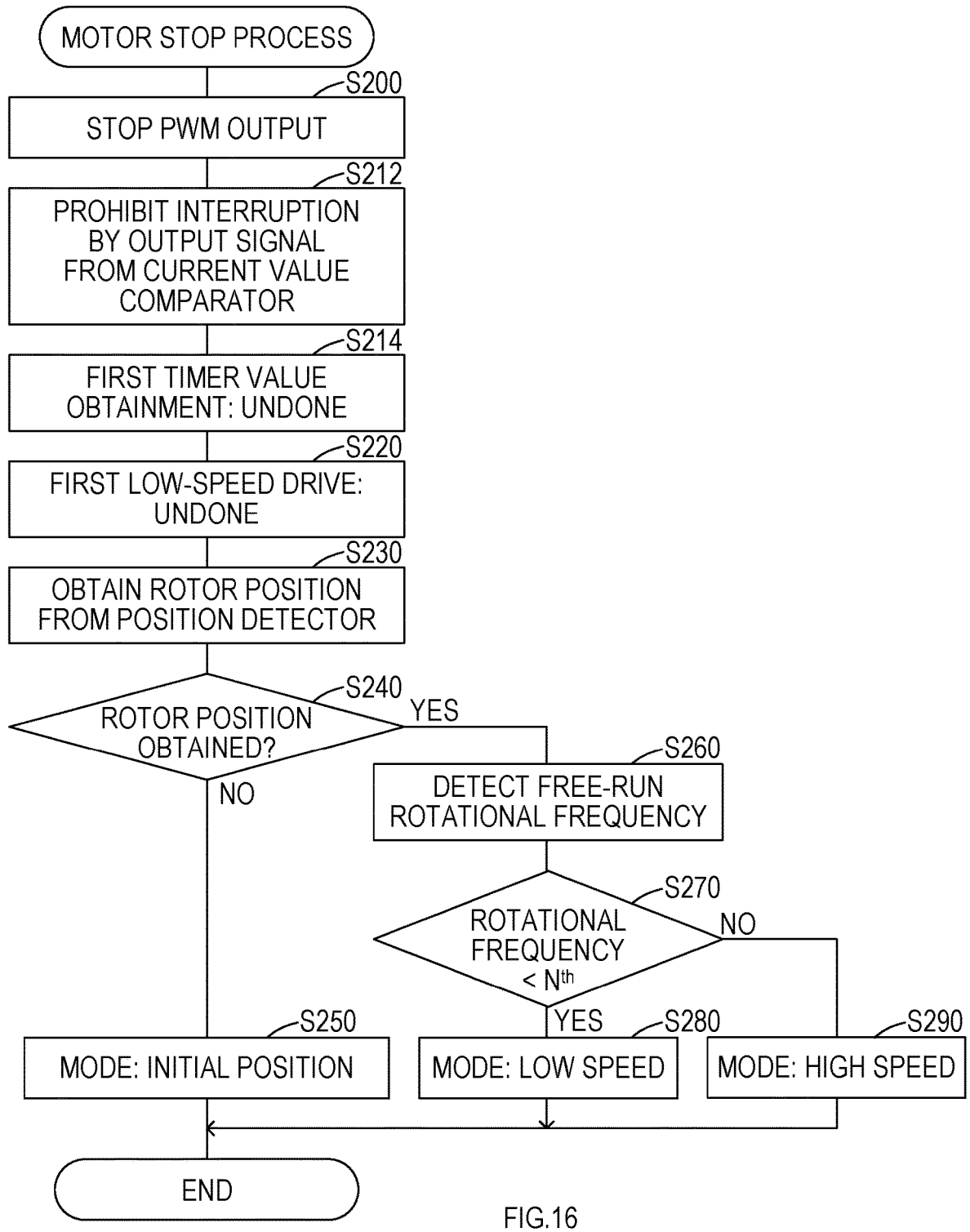
FIG. 16 is a flowchart showing a motor stop process in the second embodiment.

As shown in FIG. 16, the controller 30 executes the processes in S212 and S214 instead of the process in S210 for setting the first current obtainment flag to "Undone" in the motor stop process.

Figure 17:
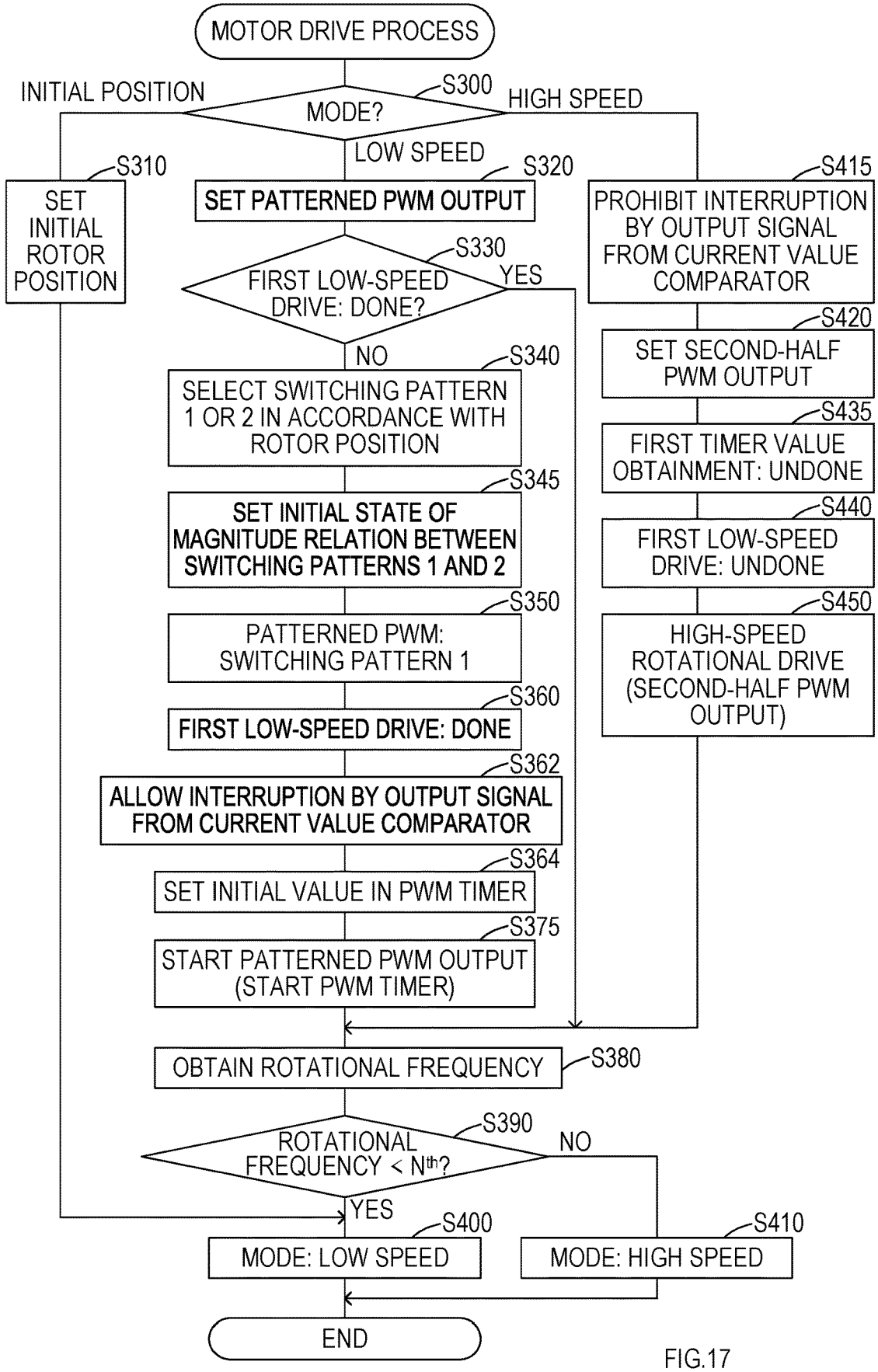
FIG. 17 is a flowchart showing a motor drive process in the second embodiment.

As shown in FIG. 17, the controller 30 executes the process in S345 between S340 and S350 in the motor drive process, executes the processes in S362, S364, and S375 instead of the process in S370, and executes the process in S415 between S300 and S420.

The process in S212 in the motor stop process is for prohibiting the interruption process (the current value comparator output signal interruption process) using an output signal from the current value comparator 38. The process in S214 is for setting a first timer value obtainment flag to "Undone".

The first timer value obtainment flag is a flag used for determining whether the controller 30 has obtained a timer value from the PWM timer after initiating the drive of the motor 20 with pattern 1.

The process in S345 executed in the motor drive process is for setting an initial state of the magnitude relation between the timer values T1 and T2 obtained from the PWM timer when driving the motor 20 with pattern 1 or pattern 2.

As illustrated in the far right column in FIG. 4B, the initial state of the magnitude relation between the timer values T1 and T2 is predefined for every rotation range and every rotational direction of the motor 20, similarly to the initial state of the magnitude relation between the current value I1 and the current value I2, and is stored in the non-volatile memory 30A along with the switching patterns. Thus, in S345, The controller 30 reads and sets the initial state of the magnitude relation between the timer values T1 and T2 from the non-volatile memory 30A.

In S362, which is executed in the motor drive process, the controller 30 allows interruption by the output signal from the current value comparator 38; and in S364, the controller 30 sets an initial value in the PWM timer. In S375, similarly to S370 in the aforementioned embodiment, the controller 30 initiates output (patterned PWM output) of the drive signal to the inverter 32 with pattern 1, which is set as the PWM pattern in S350, and also initiates time measuring by the PWM timer (counting operation).

As the controller 30 outputs the drive signal to the inverter 32 with pattern 1, the PWM timer is simultaneously activated from the initial value and measures the time of the control period of the PWM control. As the PWM timer measures the time of the control period of the PWM control, the PWM timer overflows, which causes the controller 30 to execute the PWM timer overflow interruption process as shown in FIG. 19.

As shown in FIG. 19, in the PWM timer overflow interruption process, the controller 30 stops counting operation by the PWM timer in S910 and sets the initial value in the PWM timer for counting the control period of the PWM control in S920 similarly to the process in S364.

In subsequent S930, the controller 30 initiates output (patterned PWM output) of the drive signal to the inverter 32 with pattern 1 or pattern 2, currently selected as the PWM pattern, and at the same time, initiates the time measurement (counting operation) by the PWM timer. After executing the process in S930, the controller 30 ends the PWM timer overflow interruption process.

Figure 20:
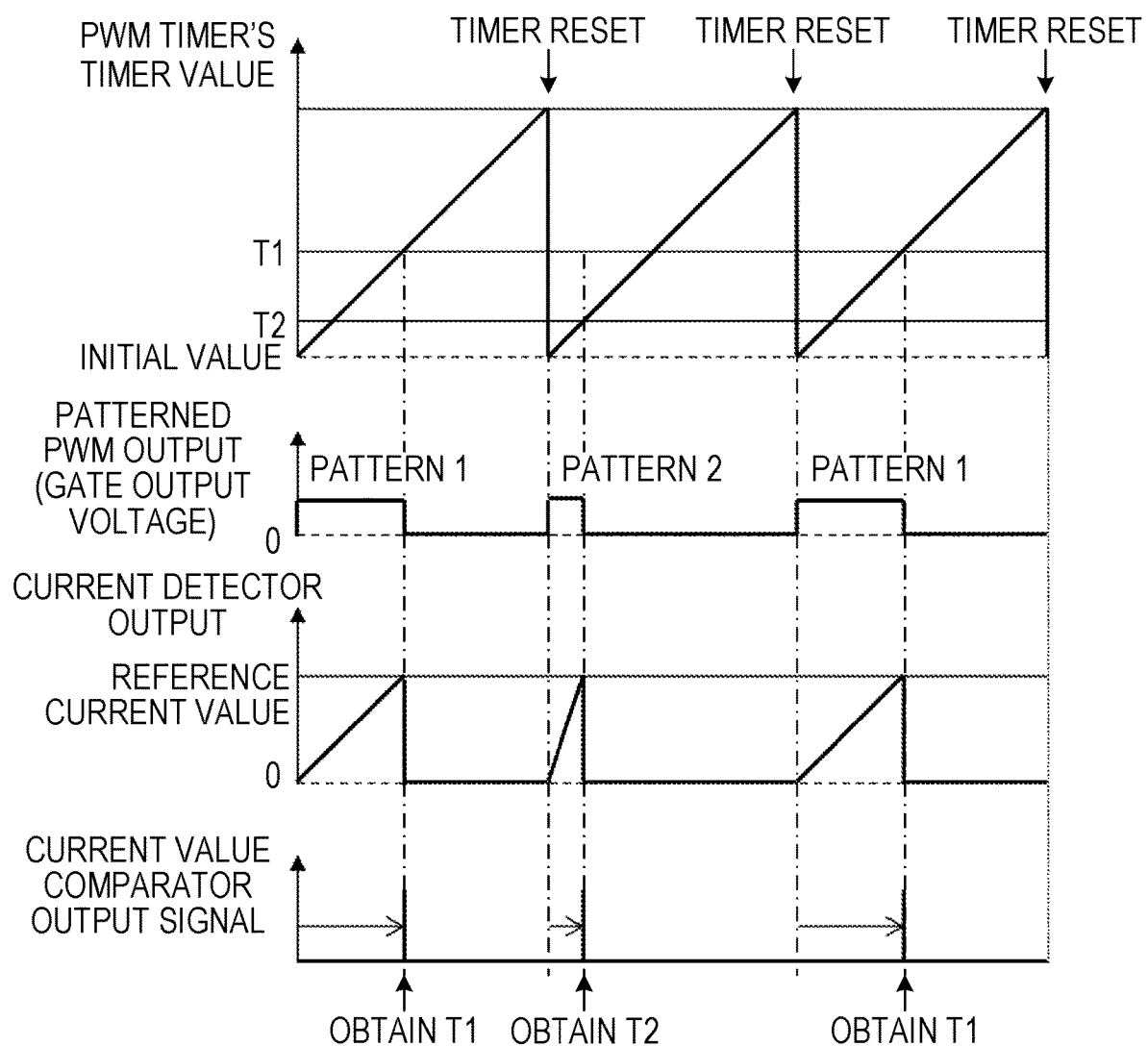
FIG. 20 is a time chart describing an operation of switching switching patterns with a PWM timer.
Figure 21:
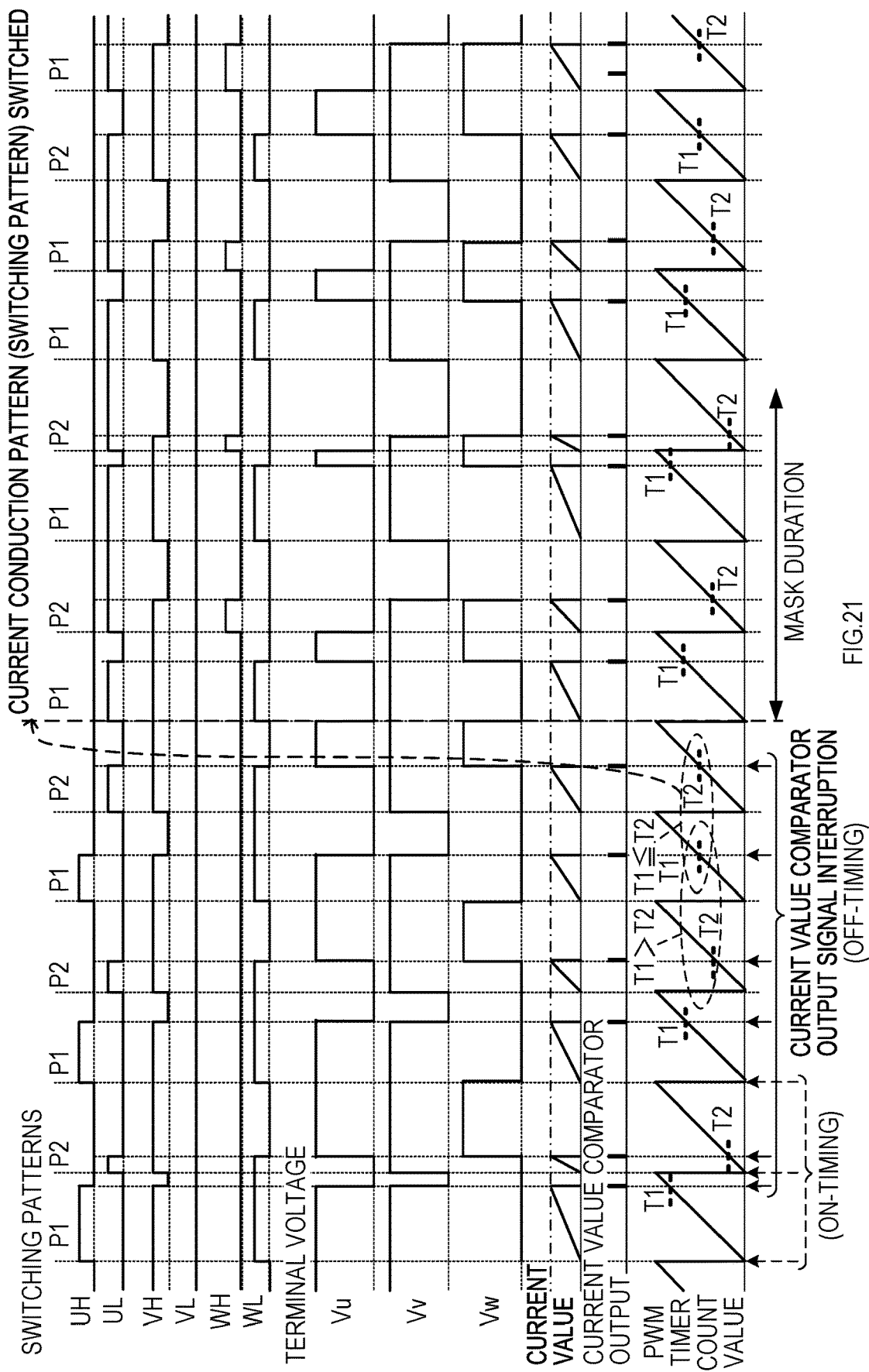
FIG. 21 is a time chart describing an operation of position detection by a timer value in the second embodiment.

As shown in FIG. 20 and FIG. 21, the PWM timer counts up the time from the initial value until the PWM timer overflows, using a single PWM control period as one period.

As shown in FIG. 18, in the current value comparator output signal interruption process, the controller 30 first stops the patterned PWM output in the low-speed mode in S700. Then, in subsequent S710, the controller 30 determines whether the ongoing interruption is an interruption with the switching pattern being pattern 1, or an interruption with the switching pattern being pattern 2.

The controller 30 proceeds to S720 when the switching pattern is pattern 1, obtains the present timer value T1 from the PWM timer, changes the switching pattern for the PWM pattern to pattern 2 in S730, proceeds to S740, and determines whether the first timer value obtainment flag is set to "Done".

If the first timer value obtainment flag is not set to "Done", as it means that the present operation mode has just been switched to the low-speed mode, the controller 30 ends the current value comparator output signal interruption process. If the first timer value obtainment flag is set to "Done", the controller 30 proceeds to S750.

If the controller 30 determines in S710 that the ongoing interruption is an interruption with the switching pattern being pattern 2, the controller 30 then proceeds to S810. In S810, the controller 30 obtains the present timer value T2 from the PWM timer and proceeds to S820.

In S820, the controller 30 changes the switching pattern for the PWM pattern to pattern 1, proceeds to S830, sets the first timer value obtainment flag to "Done", and proceeds to S750.

In S750, the controller 30 determines the magnitude relation between the latest timer values T1 and T2 obtained in S720 and S810 and determines whether their magnitude relation has been reversed.

More specifically, the current value comparator 38 outputs a signal for interruption when the current value detected in the current detector 34 reaches the reference current value. As shown in FIG. 20, the timer value T1 or T2 therefore represents a time for the current value to reach the reference current value from zero since the initiation of the inverter 32 with pattern 1 or 2.

These timer values T1 and T2 each change in accordance with the inductance of the motor 20, and thus with the rotational position of the motor 20. Thus, the magnitude relation between the timer values T1 and T2 is reversed at the given rotational position, similarly to the magnitude relation between the current value I1 and the current value I2.

The controller 30 thus determines in S750 whether the rotor 22 has passed the given rotational position (for example, the reference angles of zero degrees, 60 degrees, 120 degrees, 180 degrees, 240 degrees, and 300 degrees) by determining whether the magnitude relation between the timer values T1 and T2 has been reversed.

If the controller 30 determines in S750 that the magnitude relation between the timer values T1 and T2 has not been reversed, the controller 30 ends the current value comparator output signal interruption process. If the controller 30 determines that the magnitude relation between the timer values T1 and T2 has been reversed, the controller 30 proceeds to S760 and updates the rotor position.

In the first determination of whether the magnitude relation between the timer values T1 and T2 has been reversed in S750, the initial state of the magnitude relation between the timer values stored in the non-volatile memory 30A is used as the previous magnitude relation.

In S770, the controller 30 selects the switching pattern (pattern 1, pattern 2) to drive the motor 20 at a low speed in accordance with the updated rotor position.

In S780, the controller 30 stores the present magnitude relation between the timer values T1 and T2 in a RAM or the like as an initial state that can be used for a comparison with next magnitude relation between the timer values T1 and T2, and proceeds to S790.

In S790, the controller 30 sets one of the two switching patterns selected in S770 (pattern 1 in this embodiment) as the PWM pattern to drive the motor 20 at a low speed via the inverter 32, and proceeds to S800.

In S800, the controller 30 sets the first timer value obtainment flag to "Undone" to newly initiate the motor drive after the update of the rotor position and ends the current value comparator output signal interruption process.

As explained above, in the electric working machine 1 in the present embodiment, the controller 30 alternately switches the switching pattern between pattern 1 and pattern 2 synchronously with the control period of the PWM control similarly to the first embodiment.

As shown in FIG. 21, the controller 30 measures the time until the current flowing through the motor 20 reaches the reference current value due to electric conduction after the switching of the switching pattern as the timer value T1 or T2 based on count values of the PWM timer.

The controller 30 detects the magnitude relation between the timer values T1 and T2 every time the timer values T1 and T2 are measured, compares the detected magnitude relation with the previous magnitude relation (or the initial state), detects the rotational position of the motor 20 and switches the current conduction pattern when the detected magnitude relation is reversed from the previous magnitude relation (or the initial state).

Accordingly, the electric working machine 1 in the present embodiment can recognize the rotational position of the motor 20 in a very wide rotation range, from an extremely low-speed rotation to a high-speed rotation, appropriately control the current conduction pattern to the motor 20, and obtain the effect similar to that of the first embodiment.

Furthermore, in the present embodiment, the current value detected in the current detector 34 is used in the current value comparator 38 for a comparison with the reference current value; thus, it is not necessary to use an A/D converter to perform an A/D conversion of the current value and input the converted value to the controller 30 to detect the rotor position.

The controller 30 thus need not include an A/D converter that can perform A/D conversion of the current value at a high speed. This can simplify the configuration of the controller 30.

<Second Modification>

Next, a modification of the second embodiment (second modification) will be explained.

In the present embodiment, the controller 30 measures the time until the current value, which is detected in the current detector 34 as a result of electric conduction to the motor 20 with the switching pattern of pattern 1 or pattern 2 in the low-speed mode, reaches the reference current value as the timer values T1 or T2.

Accordingly, as explained in the first modification, the rotational position of the brushless motor 20 cannot be accurately detected from the magnitude relation between the measured timer values T1 and T2 if the reflux current or the regenerative current is flowing when the switching elements of the inverter 32 are turned on and the current conduction is initiated.

Figure 22:
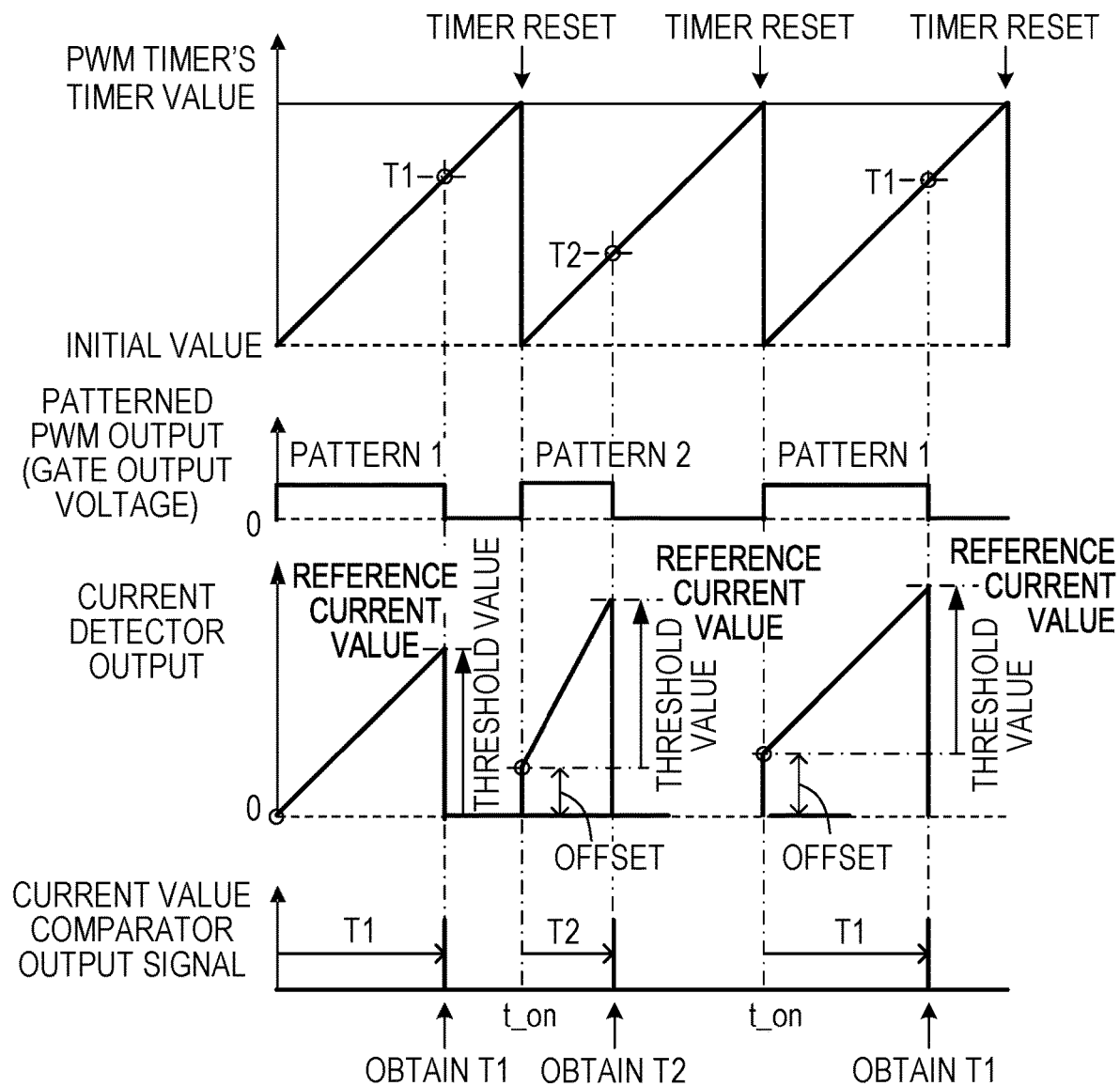
FIG. 22 is a time chart describing an operation of position detection in a second modification.

More specifically, as shown in FIG. 22, in a case where the reflux current or the regenerative current cannot be reduced to zero within one period of the PWM control, the current value detected in the current detector 34 at the on-timing t_on of the PWM control increases by the amount of the reflux current or the regenerative current.

Thus, if the reference current value, which is to be transmitted to the current value comparator 38, is constant, then the timer value T1 or T2 does not represent time required for the current value to increase by the given threshold value; consequently, the rotor position cannot be accurately detected from the magnitude relation between the timer values T1 and T2.

Therefore, in the present modification, the reflux current or the regenerative current is detected as a conduction-start current value Ist via the current detector 34 at the on-timing t_on of the PWM control, and the reference current value to be transmitted to the current value comparator 38 is set to the current value that is calculated by adding the conduction-start current value Ist and the given threshold value together.

As a result, each of the timer values T1 and T2 represents a time required for the current that flows through the brushless motor 20 to increase by the given threshold value since the conduction path from the battery pack 18 to the brushless motor 20 is completed at the on-timing of the PWM control.

Accordingly, also in the present modification, as in the first modification, the rotational position of the brushless motor 20 can be detected without being influenced by the reflux current or the regenerative current even when the controller 30 drives the brushless motor 20 under the condition that the reflux current or the regenerative current cannot be reduced to zero within one period of the PWM control.

Figure 23:
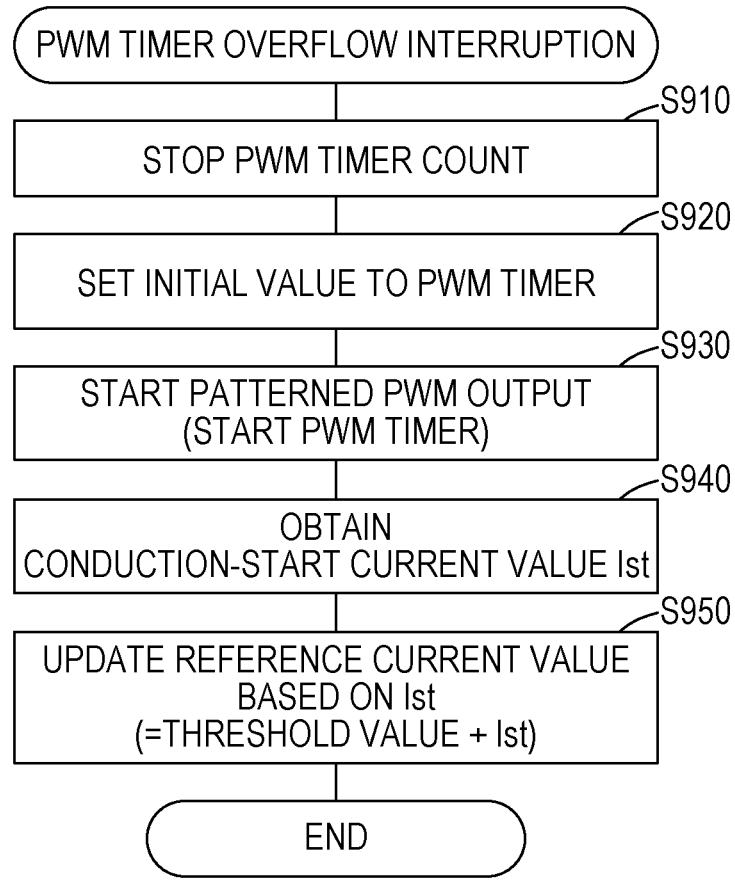
FIG. 23 is a flowchart showing a PWM timer overflow interruption process in the second modification.

As shown in FIG. 23, to set the reference current value as mentioned above, the controller 30 delivers the drive signal to the inverter 32 in S930 to initiate the time measurement by the PWM timer and then executes the processes in S940 and 950 in the PWM timer overflow interruption process.

In S940, the controller 30 obtains the current value that is being detected in the current detector 34 as the conduction-start current value Ist. In S950, the controller 30 sets the reference current value to be delivered to the current value comparator 38 by adding the conduction-start current value Ist to the predefined threshold value.

By updating the reference current value in every single period of the PWM control, the controller 30 can obtain the time required for the current value to increase by the threshold value as the timer value T1 or T2 since the current conduction from the battery pack 18 to the brushless motor 20 is initiated.

In the present embodiment, the patterned PWM output is stopped when the current value reaches the reference current value. The patterned PWM output may be continued after the current value reaches the reference current value to conduct more electricity to generate a greater rotational torque.

Other Embodiments

Although the embodiments to carry out the present disclosure have been explained above, the present disclosure may be implemented in various forms without being limited to the aforementioned embodiments and modifications.

For example, in the aforementioned embodiments, the motor 20 is an IPM three-phase brushless motor having the magnet embedded in the rotor 22. The motor 20 may also be an SPM (Surface Permanent Magnet) brushless motor having magnets attached around the rotor 22.

To be more specific, in the present disclosure, the SPM brushless motor can be used in the same manner as the aforementioned embodiments as long as the brushless motor has the inductance of the stator winding changed in accordance with the rotational position of the rotor.

In the aforementioned embodiments, rotor windings are connected in delta connection to the terminals of phases of the brushless motor. In the present disclosure, the brushless motor with rotor windings in Y-connection may also be used in the same manner as the aforementioned embodiments.

In the aforementioned embodiments, if the controller 30 determines in the determination process in S550 or S750 that the magnitude relation between the current values I1 and I2 or the magnitude relation between the timer values T1 and T2 is reversed, then the controller 30 updates the rotor position in S560 or S760.

The magnitude relation between the inductances of the motor 20, and the magnitude relation between corresponding current values or time values can also be changed due to noise or the like. Therefore, when the controller 30 detects in S550 or S750 that the magnitude relation is reversed, the controller 30 may subsequently determine the magnitude relation for several times to confirm that the magnitude relation is not reversed again before updating the rotor position.

This can inhibit erroneous detections and updates of the rotor position when the magnitude relation between the inductances of the motor 20 or the magnitude relation between the corresponding current values or measured times are temporarily changed due to noise or the like.

In the aforementioned embodiments, when the controller 30 detects the given rotational position of the motor 20 (the rotor position), the current conduction pattern is switched to the switching pattern (pattern 1, pattern 2) corresponding to the rotational position. The current value of electricity flowing through the motor 20 sometimes becomes unstable right after the conduction pattern is switched.

As shown in FIG. 11 and FIG. 21, the determination of the magnitude relation between the current values I1 and I2 or between the timer values T1 and T2 may be prohibited for a given mask duration when the controller 30 has detected the given rotational position of the motor 20 and switched the current conduction pattern.

In addition, although a grass mower was an example of the electric working machine in the present disclosure in the aforementioned embodiment, the technique of the present disclosure can be applied in the same manner as in the aforementioned embodiment to any electric working machine that includes a brushless motor as a power source.

In other words, the technique of the present disclosure may be applied to electric tools such as those for stone processing, metal processing, and wood processing, and machinery such as those for gardening. To be more specific, the technique of the present disclosure may be applied to various electric working machines such as electric hammers, electric hammer drills, electric drills, electric drivers, electric wrenches, electric grinders, electric circular saws, electric reciprocating saws, electric jigsaws, electric cutters, electric chain saws, electric planers, electric nail guns (including riveting machines), electric hedge trimmers, electric lawn trimmers, electric bush cutters, electric cleaners, electric blowers, electric sprayers, electric spreaders, and electric dust collectors.

In addition, two or more functions of one element in the aforementioned embodiments may be achieved by two or more elements; or one function of one element in the aforementioned embodiments may be achieved by two or more elements. Likewise, two or more functions of two or more elements may be achieved by one element; or one function achieved by two or more elements may be achieved by one element. A part of the configuration of the aforementioned embodiments may be omitted; and at least a part of the configuration of the aforementioned embodiments may be added to or replaced with the configuration of another one of the aforementioned embodiments. It should be noted that any and all modes that are encompassed in the technical ideas that are defined only by the languages in the claims are embodiments of the present disclosure.

What is claimed is:

1. An electric working machine including a brushless motor as a power source, the machine comprising:
an inverter including:
switching elements separately disposed in conduction paths between a direct-current power source and terminals of the brushless motor, the inverter being configured to control electric conduction to windings of the brushless motor and a direction of the electric conduction via the switching elements; and
a controller configured to:
perform a PWM control of a conduction current to the windings by switching pairs of switching patterns, each pair including a first switching pattern and a second switching pattern, to conduct electricity to the windings via the inverter for every given commutation timing of the brushless motor and by turning on and off the switching elements of the inverter in accordance with the switching patterns, the first switching pattern and the second switching pattern including different on and off states for each of the switching elements;
alternately switch between the first switching pattern and the second switching pattern for controlling on and off states of the switching elements synchronously with a period of the PWM control, and detect a rotational position of the brushless motor from a magnitude relation between an inductance in the first switching pattern and an inductance in the second switching pattern of the brushless motor, which are produced in different current paths by switching the switching pattern, thereby to set the given commutation timing; and
switch a first pair of the first switching pattern and the second switching pattern to a second pair of the first switching pattern and the second switching pattern for the every given commutation timing.

2. The electric working machine according to claim 1, further comprising:
a current detector configured to detect an electric current flowing through the brushless motor,
wherein, the controller is configured to obtain a current value detected in the current detector when electricity is conducted to the brushless motor with each of the switching patterns as a parameter representing an inductance of the brushless motor, and detect the rotational position from a magnitude relation between the obtained current values.

3. The electric working machine according to claim 2, wherein the controller is configured to obtain a difference between a conduction-start current at an initiation of conduction and a conduction-stop current at an end of the conduction as a parameter representing an inductance value of the brushless motor when electricity is conducted to the brushless motor with the switching pattern.

4. The electric working machine according to claim 1, further comprising:

a current detector configured to detect a current flowing through the brushless motor,
wherein the controller is configured to measure a time for a current value detected in the current detector to reach a given threshold value since an initiation of electric conduction to the brushless motor with each of the switching patterns as a parameter representing the inductance of the brushless motor for each switching pattern, and detect the rotational position from a magnitude relation between the measured times.

5. The electric working machine according to claim 4,
wherein the controller is configured to measure a time for the current value to change by a given threshold value from a conduction-start current at an initiation of conduction as a parameter representing an inductance value of the brushless motor when electricity is conducted to the brushless motor with the switching pattern.

6. The electric working machine according to claim 1, wherein the switching patterns are each configured to generate a rotational torque on a rotor of the brushless motor when the on and off states of the switching elements are controlled with the switching patterns.

7. The electric working machine according to claim 1, wherein the controller is configured to detect the rotational position at a timing when the magnitude relation between the inductances of the brushless motor is changed due to the switching with the switching patterns.

8. The electric working machine according to claim 1, wherein the controller is configured to adjust an on-time of the switching elements in accordance with a power supply voltage of the direct-current power source when performing the PWM control of the brushless motor with the switching pattern.

9. An electric working machine including a brushless motor as a power source, the machine comprising:
an inverter including:
switching elements separately disposed in conduction paths between a direct-current power source and terminals of the brushless motor, the inverter being configured to control electric conduction to windings of the brushless motor and a direction of the electric conduction via the switching elements;
a current detector configured to detect an electric current flowing through the brushless motor; and
a controller configured to:
perform a PWM control of a conduction current to the windings by switching switching patterns to conduct electricity to the windings via the inverter for every given commutation timing of the brushless motor and by turning on and off the switching elements of the inverter in accordance with the switching patterns, the switching patterns including different on and off states for each of the switching elements;
sequentially switch a switching pattern for controlling on and off states of the switching elements to one of the switching patterns synchronously with a period of the PWM control, and detect a rotational position of the brushless motor from a magnitude relation between inductances of the brushless motor, which are produced in different current paths by switching the switching pattern, thereby to set the given commutation timing;
obtain a current value detected in the current detector when electricity is conducted to the brushless motor with each of the switching patterns as a parameter representing an inductance of the brushless motor, and detect the rotational position from a magnitude relation between the obtained current values; and
obtain a difference between a conduction-start current at an initiation of conduction and a conduction-stop current at an end of the conduction as a parameter representing an inductance value of the brushless motor when electricity is conducted to the brushless motor with the switching pattern.

10. An electric working machine including a brushless motor as a power source, the machine comprising:
an inverter including:
switching elements separately disposed in conduction paths between a direct-current power source and terminals of the brushless motor, the switching elements including six transistors (Q1, Q2, Q3, Q4, Q5, and Q6);
Q1 being on a high side of a U-phase node and is controlled by a first signal (UH);
Q2 being on a high side of a V-phase node and is controlled by a second signal (VH);
Q3 being on a high side of a W-phase node and is controlled by a third signal (WH);
Q4 being on a low side of the U-phase node and is controlled by a fourth signal (UL);
Q5 being on a low side of the V-phase node and is controlled by a fifth signal (VL); and
Q6 being on a low side of the W-phase node and is controlled by a sixth signal (WL),
the inverter being configured to control electric conduction to windings of the brushless motor and a direction of the electric conduction via the switching elements; and
a controller configured to:
perform a PWM control of a conduction current to the windings by switching switching patterns to conduct electricity to the windings via the inverter for every given commutation timing of the brushless motor and by turning on and off the switching elements of the inverter in accordance with the switching patterns, the switching patterns including different on and off states for each of the switching elements; and
sequentially switch a switching pattern for controlling on and off states of the switching elements to one of the switching patterns synchronously with a period of the PWM control, and detect a rotational position of the brushless motor from a magnitude relation between inductances of the brushless motor, which are produced in different current paths by switching the switching pattern, thereby to set the given commutation timing,
wherein the switching patterns are each configured to generate a rotational torque on a rotor of the brushless motor when the on and off states of the switching elements are controlled with the switching patterns in order to detect the rotational position of the brushless motor,
a first switching pattern is UL=on, VH=on, WL=on, UH=off, VL=off, and WH=off when a rotor position is between 0 and 60 degrees, and a rotational direction is positive, and
a second switching pattern is UL=on, VH=on, WH=on, UH=off, VL=off, and WL=off when the rotor position is between 0 and 60 degrees, and the rotational direction is positive.

* * * * *